United States Patent
Demir et al.

(10) Patent No.: US 7,433,437 B2
(45) Date of Patent: Oct. 7, 2008

(54) METHOD FOR ESTABLISHING A COMMUNICATION LINK

(75) Inventors: Alpaslan Demir, Commack, NY (US); Donald M. Grieco, Manhassett, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 278 days.

(21) Appl. No.: 11/205,846

(22) Filed: Aug. 17, 2005

(65) Prior Publication Data

US 2005/0271177 A1    Dec. 8, 2005

Related U.S. Application Data

(63) Continuation of application No. 10/083,796, filed on Feb. 27, 2002, now Pat. No. 7,046,754, which is a continuation of application No. 09/918,611, filed on Jul. 31, 2001, now Pat. No. 6,826,244.

(60) Provisional application No. 60/271,642, filed on Feb. 27, 2001.

(51) Int. Cl.
*H04L 7/04* (2006.01)
*H04B 1/16* (2006.01)

(52) U.S. Cl. ........................... 375/362; 375/342

(58) Field of Classification Search ................. 375/362, 375/346, 145, 146, 149; 370/342, 350
See application file for complete search history.

(56) References Cited

U.S. PATENT DOCUMENTS

| | | | |
|---|---|---|---|
| 5,313,457 A | * | 5/1994 | Hostetter et al. ............ 370/320 |
| 5,448,570 A | | 9/1995 | Toda et al. |
| 5,809,426 A | | 9/1998 | Radojevic et al. |
| 5,828,659 A | | 10/1998 | Teder et al. |
| 5,881,100 A | * | 3/1999 | Durrant et al. ............... 375/150 |
| 5,910,948 A | | 6/1999 | Shou et al. |
| 6,014,376 A | | 1/2000 | Abreu et al. |
| 6,038,250 A | | 3/2000 | Shou et al. |

(Continued)

FOREIGN PATENT DOCUMENTS

EP       0 825 737       2/1998

(Continued)

OTHER PUBLICATIONS

Nyström et al., "Comparision of Cell Search Methods for Asynchronous Wideband CDMA Cellular System," International Conference on Universal Personal Communications, IEEE, New York, NY, US, vol. 2, Oct. 5, 1998, pp. 783-787.

(Continued)

*Primary Examiner*—Khai Tran
(74) *Attorney, Agent, or Firm*—Volpe and Koenig, P.C.

(57) ABSTRACT

A user equipment (UE) for establishing a communication link comprising a first module for processing a received communication signal and generating an index value associated with a primary synchronization code within said communication signal; a second module for generating a scrambling code group number, a slot offset, and secondary synchronization code based on output provided by the first module; a third module for retrieving a primary scrambling code based on the scrambling code group number and slot offset; and a controller coupled to said first module, second module, and third module for controlling an a search frequency of the UE for establishing a communication link.

3 Claims, 16 Drawing Sheets

U.S. PATENT DOCUMENTS

| | | | |
|---|---|---|---|
| 6,223,037 | B1 | 4/2000 | Parkkila |
| 6,097,709 | A | 8/2000 | Kuwabara |
| 6,131,030 | A | 10/2000 | Schon et al. |
| 6,208,871 | B1 | 3/2001 | Hall et al. |
| 6,246,673 | B1 | 6/2001 | Tiedemann et al. |
| 6,363,060 | B1 | 3/2002 | Sarkar |
| 6,480,558 | B1 | 11/2002 | Ottosson et al. |
| 6,504,830 | B1 | 1/2003 | Ostberg et al. |
| 6,590,881 | B1 | 7/2003 | Wallace et al. |
| 6,728,297 | B2 | 4/2004 | Rudolf |
| 6,882,727 | B1 | 4/2005 | Vialen et al. |
| 2002/0075978 | A1 | 6/2002 | Dick et al. |
| 2002/0146039 | A1 | 10/2002 | Demir et al. |
| 2003/0203745 | A1 | 10/2003 | Chiang et al. |

FOREIGN PATENT DOCUMENTS

| | | |
|---|---|---|
| EP | 0 838 910 | 4/1998 |
| EP | 0852430 | 7/1998 |
| EP | 0954122 | 11/1999 |
| JP | 08-163002 | 6/1996 |
| JP | 10-246769 | 9/1998 |
| TW | 378440 | 1/2000 |
| TW | 387186 | 4/2000 |
| TW | 391101 | 5/2000 |
| TW | 288239 | 2/2001 |
| TW | 421941 | 2/2001 |
| WO | 94/28643 | 12/1994 |
| WO | 99/00912 | 1/1999 |
| WO | 99/19992 | 4/1999 |
| WO | 99/30519 | 6/1999 |
| WO | 99/43099 | 8/1999 |
| WO | 99/44306 | 9/1999 |
| WO | 99/66754 | 12/1999 |
| WO | 00/04661 | 1/2000 |
| WO | 00/14907 | 3/2000 |
| WO | 00/31998 | 6/2000 |
| WO | 00/44117 | 7/2000 |
| WO | 01/01596 | 1/2001 |
| WO | 01/10160 A1 | 2/2001 |
| WO | 01/41482 | 6/2001 |

OTHER PUBLICATIONS

Yahata, "Autonomous Master-Slave Frame Synchronization Among Microcellular Base Stations," Electronics & Communications in Japan, Part I—Communications, Scripta Technica, New York, US, vol. 82, No. 4, Apr. 1999, pp. 1-13.

Nielsen et al., "WCDMA Intial Cell Search", VTC 2000-Fall, IEEE VTS 52nd, Vehicular Technology Conference, vol. 1 of 6, Conf. 52, Sep. 2000, pp. 377-383.

Higuchi et al., "Experimental Evaluation of 3-Step Cell Search Method in W-CDMA Mobile Radio," VTC 2000 IEEE, 0-7803-5718-3, pp. 303-307.

Wang et al., "Cell Search in W-CDMA," IEEE Journal on Selected Areas in Communications, vol. 18, No. 8, Aug. 2000, pp. 1470-1482.

"Universal Mobile Telecommunications System (UMTS); UE Procedures in Idle Mode and Procedures for Cell Reselection in Connected Mode (3GPP TS 25.304 version 3.5.0 Release 1999)", ETSI TS 125 304 V3.5.0, Dec. 2000.

"UMTS Terrestrial Radio Access Concept Evaluation," ETSI Technical Report, XX, XX, Dec. 1997, pp. 47-48.

Universal Mobile Telecommunications System (UMTS); UMTS Terrestrial Radio Access (UTRA) Concept evaluation; (UMTS 30.06 version 3.0.0); TR 101 146 V3.0.0 (Dec. 1997); pp. 47-49.

3rd Generation Partnership Project; Technical Specification Group Radio Access Network; Physical channels and mapping of transport channels onto physical channels (FDD) (3G TS 25.211 version 3.1.0); 3G TS 25.211 V3.1.1 (Dec. 1999).

3rd Generation Partnership Project; Technical Specification Group Radio Access Network; Physical channels and mapping of transport channels onto physical channels (FDD) (Release 4); 3G TS 25.211 V4.1.0 (Jun. 2001).

3rd Generation Partnership Project; Technical Specification Group Radio Access Network; Spreading and modulation (FDD) (Release 1999); 3G TS 25.213 V3.4.0 (Dec. 2000).

3rd Generation Partnership Project; Technical Specification Group Radio Access Network; Spreading and modulation (FDD) (Release 4); 3G TS 25.213 V4.1.0 (Jun. 2001).

3GPP, "Universal Mobile Telecommunications System (UMTS); UE Procedures in Idle Mode and Procedures for Cell Reselection in Connected Mode," 3GPP TS 25.304 V3.2.0 (Release 1999) (Mar. 2000).

3GPP, "Universal Mobile Telecommunications System (UMTS); UE Procedures in Idle Mode and Procedures for Cell Reselection in Connected Mode," 3GPP TS 25.304 V3.6.0 (Release 1999) (Mar. 2001).

3GPP, "3rd Generation Partnership Project; Technical Specification Group Radio Access Network; Physical channels and mapping of transport channels onto physical channels (FDD) (Release 1999)," 3GPP TS 25.211 V3.2.0), (Mar. 2000).

3GPP, "3rd Generation Partnership Project; Technical Specification Group Radio Access Network; Physical channels and mapping of transport channels onto physical channels (FDD) (Release 1999)," 3GPP TS 25.211 V3.5.0), (Dec. 2000).

3GPP, "3rd Generation Partnership Project; Technical Specification Group Radio Access Network; Spreading and modulation (FDD) (Release 1999)," 3GPP TS 25.213 V3.2.0, (Mar. 2000).

3GPP, "3rd Generation Partnership Project; Technical Specification Group Radio Access Network; Spreading and modulation (FDD) (Release 1999)," 3GPP TS 25.213 V3.5.0, (Apr. 2001).

3GPP, "Third Generation Partnership Project; Technical Specification Group Radio Access Network; Synchronisation in UTRAN Stage 2 (Release 99)," 3G TS 25.402 V3.1.0, (Mar. 2000).

3GPP, "Third Generation Partnership Project; Technical Specification Group Radio Access Network; Synchronisation in UTRAN Stage 2 (Release 99)," 3G TS 25.402 V3.4.0, (Dec. 2000).

3rd Generation Partnership Project; Technical Specification Group Radio Access Network; Spreading and modulation (FDD) (Release 4); 3G TS 25.213 V4.1.0 (Jun. 2001).

Higuchi et al., "Experimental Evaluation of 3-Step Cell Search Method in W-CDMA Mobile Radio," VTC 2000 IEEE, 0-7803-5718-3, pp. 303-307.

Nielsen et al., "WCDMA Initial Cell Search", VTC 2000-Fall, IEEE VTS 52nd, Vehicular Technology Conference, vol. 1 of 6, Conf. 52, pp. 377-383, (Sep. 2000).

Nystrom et al., "Comparison of Cell Search Methods for Asynchronous Wideband CDMA Cellular System," International Conference on Universal Personal Communications, IEEE, vol. 2, pp. 783-787 (Oct. 5, 1998).

Universal Mobile Telecommunications System (UMTS); UMTS Terrestrial Radio Access (UTRA) Concept evaluation; (UMTS 30.06 version 3.0.0); TR 101 146 V3.0.0, pp. 47-49, (Dec. 1997).

Wang et al., "Cell Search In W-CDMA," IEEE Journal on Selected Areas in Communications, vol. 18, No. 8, pp. 1470-1482 (Aug. 2000).

Yahata, "Autonomous Master-Slave Frame Synchronization Among Microcellular Base Stations," Electronics & Communications in Japan, Part I—Communications, Scripta Technica, vol. 82, No. 4, pp. 1-13 (Apr. 1999).

\* cited by examiner

FAST HADAMARD TRANSFORM STRUCTURE $$\text{INPUT MATRIX} = \begin{bmatrix} \overbrace{\begin{matrix} x_{1,1} & x_{1,2} & \cdot & \cdot & \cdot & x_{1,16} \\ x_{2,1} & x_{2,2} & \cdot & \cdot & \cdot & x_{2,16} \\ \cdot & \cdot & x_{i,j} & \cdot & \cdot & \cdot \\ \cdot & \cdot & \cdot & \cdot & \cdot & \cdot \\ x_{15,1} & x_{15,2} & \cdot & \cdot & \cdot & x_{15,16} \end{matrix}}^{\text{ELEMENTS OF FHT OUTPUT}} \end{bmatrix}_{15 \times 16}$$

i = 1,2,3,......15 SLOTS
j = 1,2,3,......16 ELEMENTS PER SLOT FROM HGC OUTPUT

FIG. 7

$$\text{CODE GROUP MATRIX} = \begin{bmatrix} 1 & 1 & 2 & 8 & \cdot & \cdot & \cdot & 15 & 7 & 16 \\ 1 & 1 & 5 & 16 & \cdot & \cdot & \cdot & 14 & 12 & 10 \\ \cdot & \cdot & \cdot & \cdot & x_{i,j} & \cdot & \cdot & \cdot & \cdot & \cdot \\ \cdot & \cdot & \cdot & \cdot & \cdot & \cdot & \cdot & \cdot & \cdot & \cdot \\ 9 & 12 & 10 & 15 & \cdot & \cdot & \cdot & 12 & 16 & 10 \end{bmatrix}_{64 \times 15}$$
(KNOWN MATRIX)

i = 1,2,3,......64 GROUPS
j = 1,2,3,......15 SLOTS
$x_{i,j}$ = S-SCH CODES. ONE OUT OF 16 PER SLOT.

FIG. 8

$$\text{CORRELATION MATRIX} = \begin{bmatrix} c_{0,0} & c_{0,1} & \cdot & \cdot & c_{0,14} \\ c_{1,0} & c_{1,1} & \cdot & \cdot & c_{1,14} \\ \cdot & \cdot & c_{i,j} & \cdot & \cdot \\ \cdot & \cdot & \cdot & \cdot & \cdot \\ c_{63,0} & c_{63,1} & \cdot & \cdot & c_{63,14} \end{bmatrix}_{64 \times 15} \text{PER FRAME}$$

$c_{i,j} = \sum_k$ INPUT MATRIX [k][CODE GROUP MATRIX[i][k]]

i = 0,1,2,......63 GROUPS
j = 0,1,2,......14 CYCLIC SHIFTS RESPECT TO COLUMNS (SLOT OFFSETS).
k = 0,1,2,......14 SLOTS PER FRAME.

FIG. 9

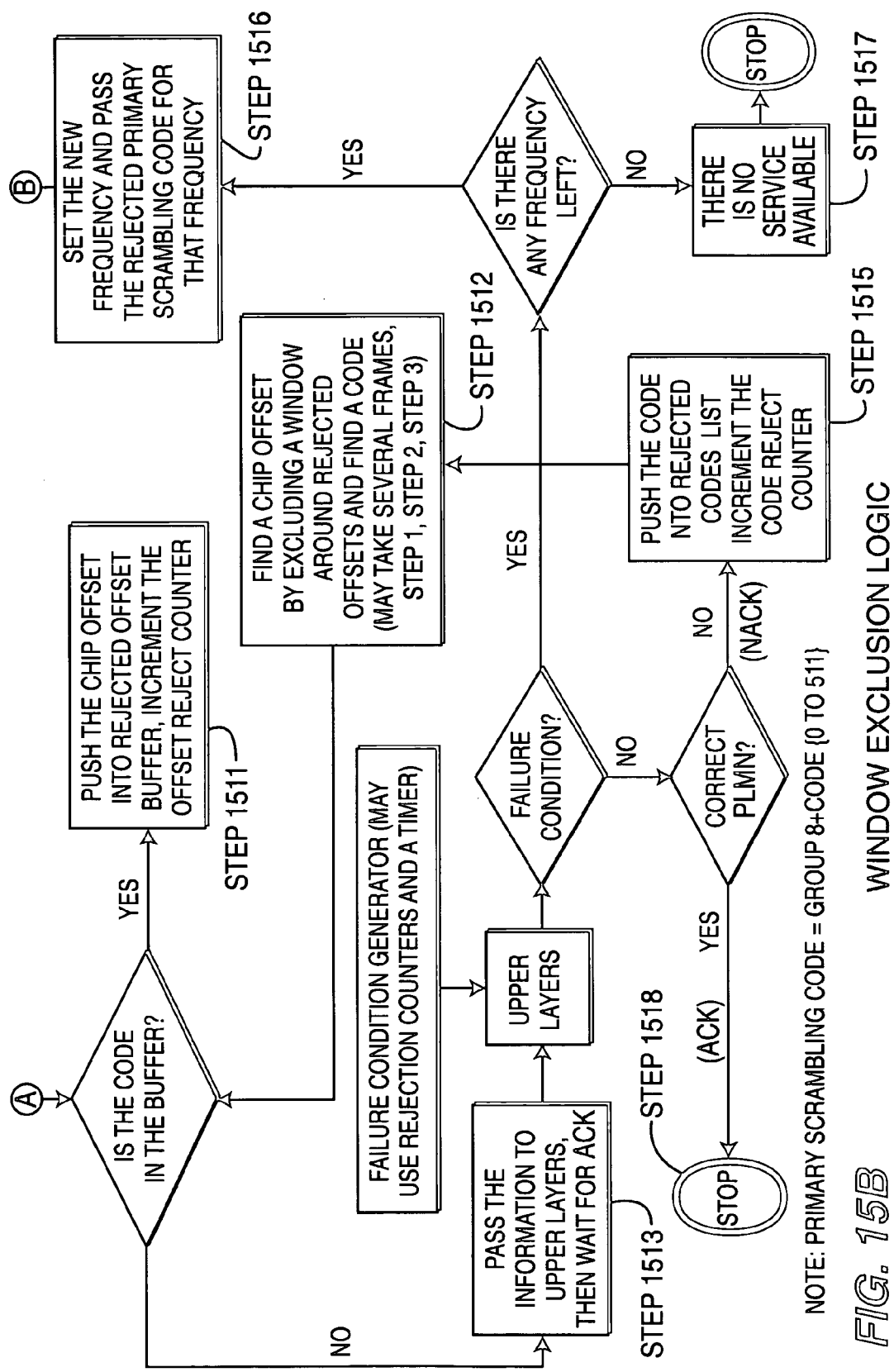

METHOD FOR ESTABLISHING A COMMUNICATION LINK

This application is a continuation of application Ser. No. 10/083,796, filed on Feb. 27, 2002; which is a continuation of application Ser. No. 09/918,611, filed on Jul. 31, 2001, now issued as U.S. Pat. No. 6,826,244; which claims benefit of Provisional Application No. 60/271,642, filed on Feb. 27, 2001, all of which are incorporated herein by reference.

BACKGROUND

The present invention generally relates to user equipment (UE) synchronization to a base station. More particularly the present invention relates to a cell search system which utilizes an improved initial cell search algorithm.

Initial cell search algorithms are used to synchronize the UE to a base station. The UE accomplishes this procedure via a common downlink channel called the physical synchronization channel (PSCH). Referring to FIG. 2, the PSCH has a structure wherein the same primary synchronization code (PSC) is transmitted at the beginning of each slot, while a secondary synchronization code (SSC) is transmitted for each slot, resulting in fifteen (15) different SSCs. As those skilled in the art know, a frame that is fifteen (15) slots long can transmit fifteen (15) SSCs.

The transmit order of the SSC depends on the primary scrambling code group number. As an example, in a five hundred and twelve (512) cell system, there are sixty four (64) groups. In each group, the patterns of the SSC and its cyclic shifts are different. As a result, there are five hundred and twelve (512) primary scrambling codes. Each cell, of a five hundred and twelve cell (512) system, is assigned a code such that no one code is used by more than one cell in a given reception area.

Therefore the cell search synchronization systems determine the primary scrambling code of a cell utilizing an initial cell search algorithm. Common initial cell search algorithms utilize three (3) major algorithms: a step 1 algorithm detects the PSC and determines a chip offset; a step 2 algorithm uses the information given by step 1 and detects the slot offset and code group number; and a step 3 algorithm utilizes the information provided by the step 2 algorithm and detects the primary scrambling code. Unfortunately, each step algorithm has an inherent error associated with it. The error present in each of the steps is caused by the UE detection of noise associated with the received common downlink channel, which can result in a high number of false detections.

Also, the common initial cell search algorithms can not handle a rejection by the upper layers of the wrong public land mobile network (PLMN). Since most algorithms detect the strongest cell in the common downlink channel, it is likely that each time the algorithm locates a cell the same PLMN will be associated with the cell. This results in a deadlock and ultimately an indication to the UE that there is no service.

Accordingly, there exists a need for a system and method that reduces the number of false detections by the initial cell search algorithm and is able to overcome the deadlock associated with a rejection due to the wrong PLMN.

SUMMARY

The present invention relates to a user equipment (UE) for establishing a communication link comprising a first module for processing a received communication signal and generating an index value associated with a primary synchronization code within said communication signal; a second module for generating a scrambling code group number, a slot offset, and secondary synchronization code based on output provided by the first module; a third module for retrieving a primary scrambling code based on the scrambling code group number and slot offset; and a controller coupled to said first module, second module, and third module for controlling an a search frequency of the UE for establishing a communication link.

BRIEF DESCRIPTION OF THE DRAWINGS

FIG. 7 is an illustration of the input matrix structure in accordance with the preferred embodiment of the present invention.

FIG. 8 is an illustration of the code group matrix structure in accordance with the preferred embodiment of the present invention.

FIG. 9 is an illustration of the correlation matrix structure in accordance with the preferred embodiment of the present invention.

FIGS. 15A and 15B show a flow diagram of the controller window exclusion logic in accordance with the preferred embodiment of the present invention.

DETAILED DESCRIPTION OF THE PREFERRED EMBODIMENT

Figure 1:
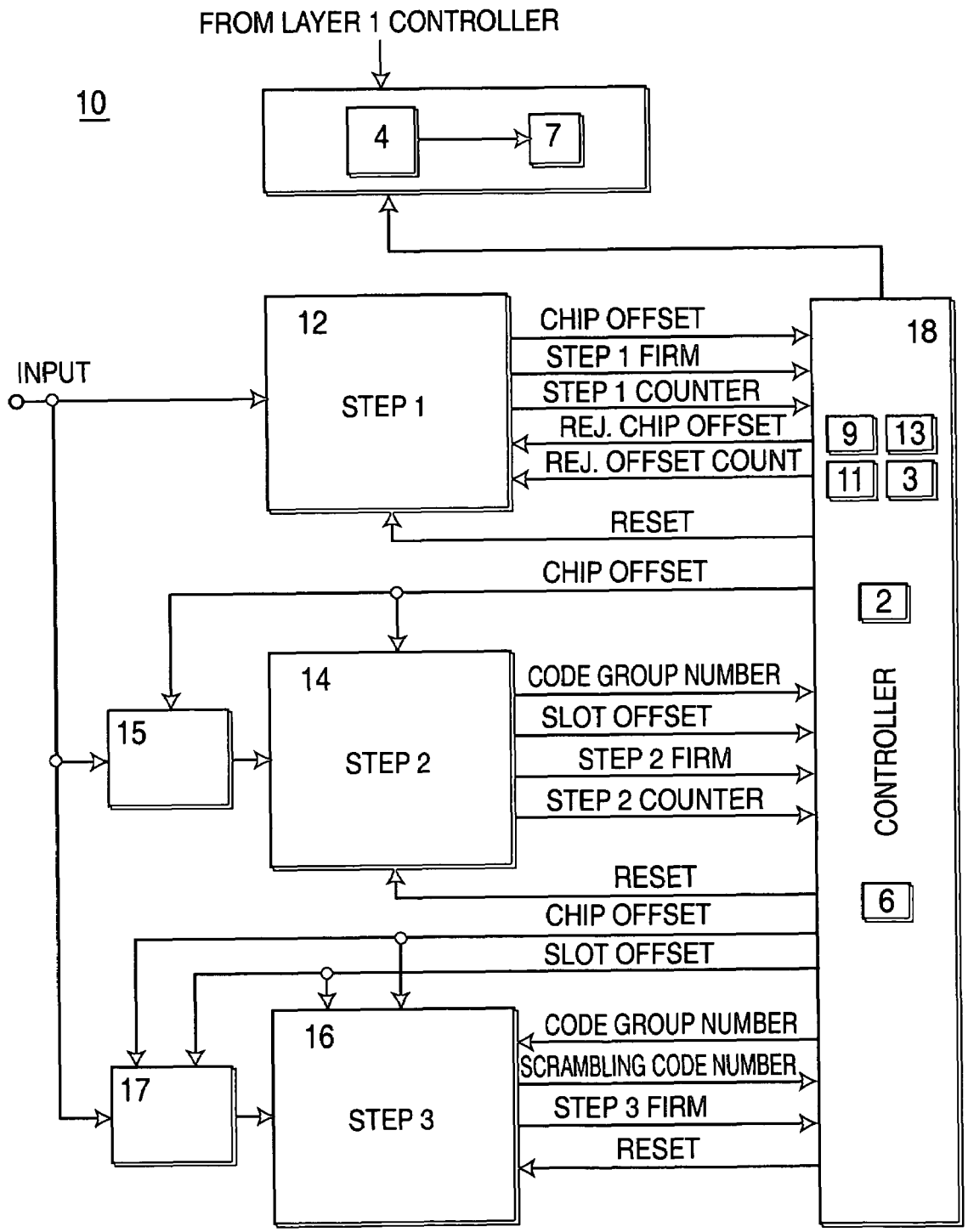
FIG. 1 is an illustration of the initial cell search system made in accordance with the preferred embodiment of the present invention.

The cell search synchronization system 10 in accordance with the preferred embodiment of the present invention is illustrated in FIG. 1. The system 10 comprises a step 1 module 12, a step 2 module 14, a step 3 module 16, and a controller 18 to accomplish synchronization between a user equipment (UE) and a base station. In order to accomplish this synchronization, the UE, through the cell search synchronization system 10, utilizes an initial cell search algorithm, to be disclosed hereinafter.

Figure 3:
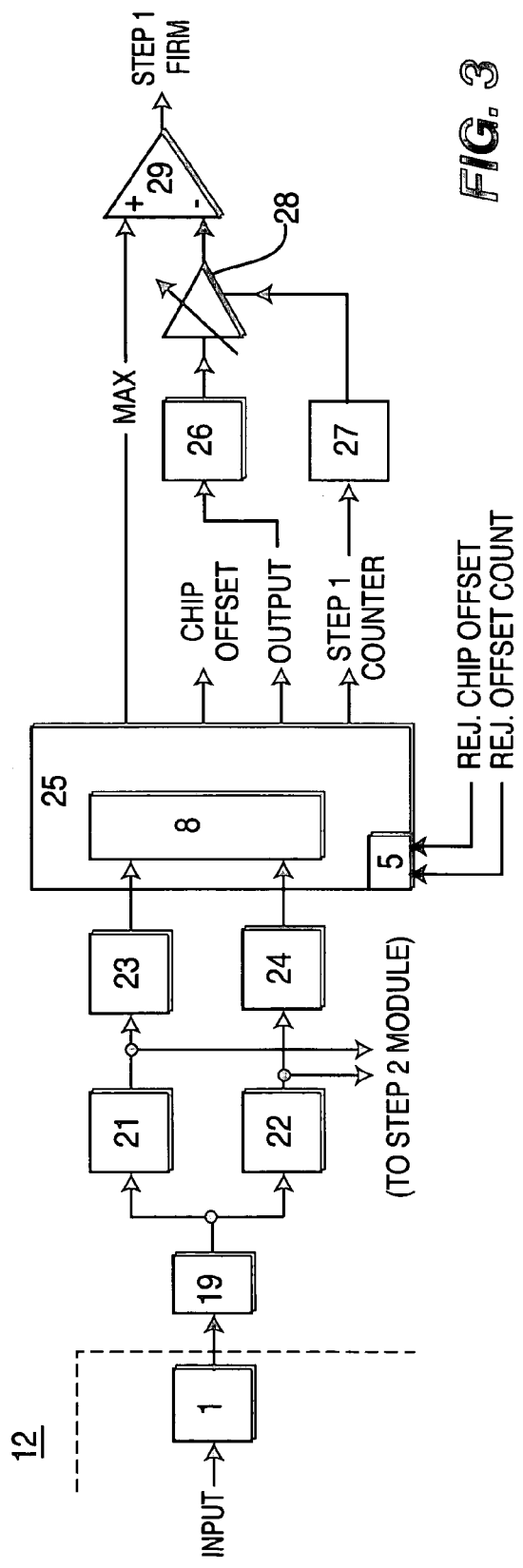
FIG. 3 is a block diagram of the step 1 module in accordance with the preferred embodiment of the present invention.

The step 1 algorithm of the initial cell search algorithm is accomplished using the step 1 module 12. Referring to FIG. 3, the step 1 module 12 comprises two Hierarchical Golay Correlators (HGC) 21, 22, two absolute value modifiers (AVM) 23, 24, a decision circuit 25, a normalizer circuit 26, a look up table 27, a multiplier 28, a splitter 19, and a step 1 comparator 29. The root raised cosine filter (RRCFIR) 1 shown is not a part of the step 1 module 12, but are illustrated therein to provide a complete picture.

The purpose of the step 1 module 12 is to find the strongest path over a frame worth of samples the UE has detected and determine the chip offset of the strongest path. The RRCFIR 1 coupled to the splitter 19 is a pulse shaped filter that samples the downlink communication signal from the base station at twice the chip rate and forwards the sample signal to the splitter 19. The splitter 19 splits the sampled signal into its even and odd samples and passes them to HGCs 21, 22.

Figure 5:
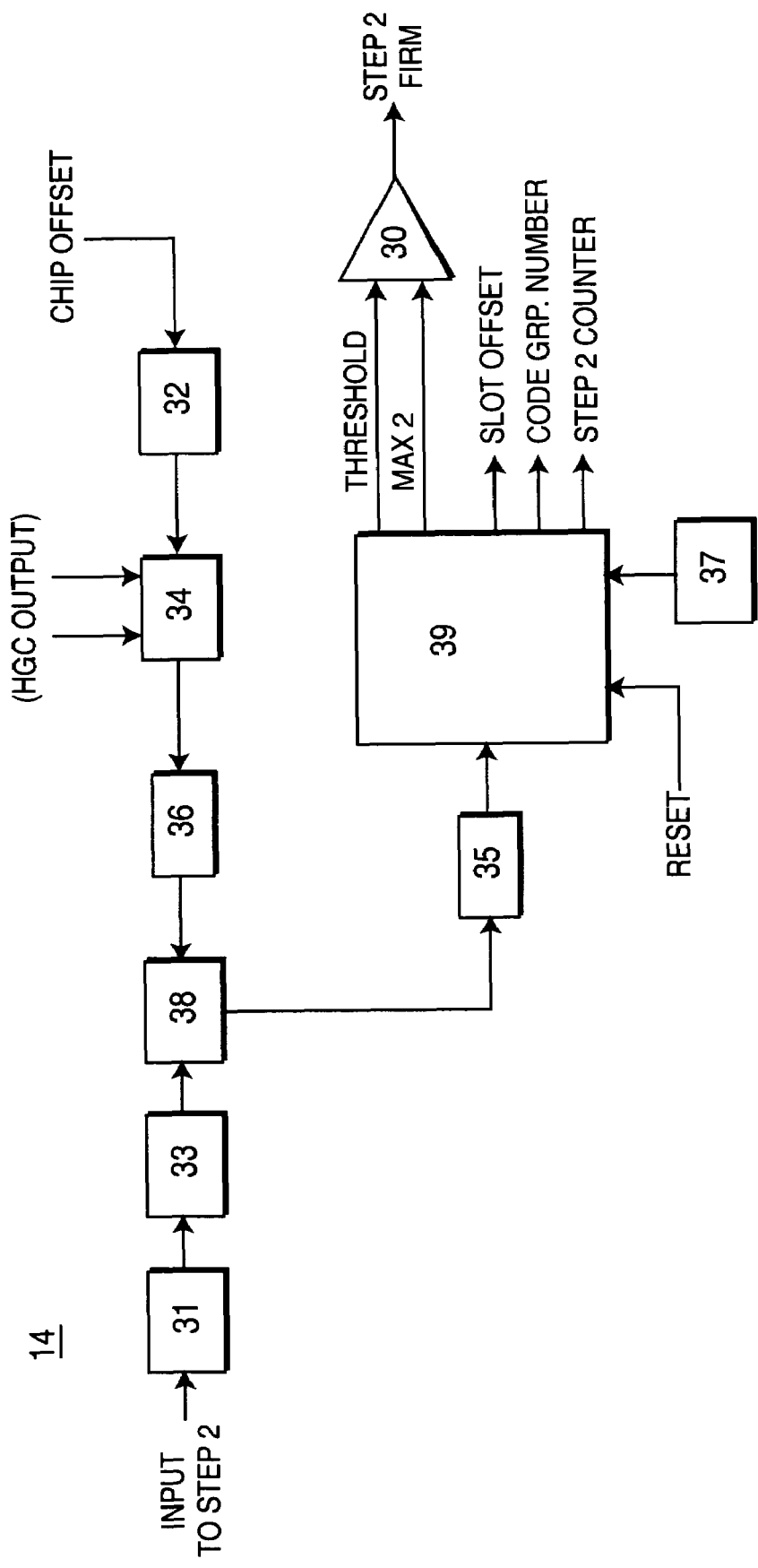
FIG. 5 is a block diagram of the step 2 module in accordance with the preferred embodiment of the present invention.

The HGCs 21, 22 are coupled to the AVMs 23, 24, and the sample selector 34 of the step 2 module 14 (illustrated in FIG. 5), to be disclosed hereinafter. HGCs 21, 22 correlate the PSC of the input signal. As those skilled in the art know, the HGCs 21, 22 output the complex values of the even and odd samples of the input signal, respectively. The HGC 21, 22 outputs are forwarded to the AVMs 23, 24 and the sample selector 34.

The AVMs 23, 24, coupled to the HGCs 21, 22 and the decision circuit 25, determine the magnitudes of the HGCs 21, 22, equation to generate the magnitudes is determined according to the following equation:

$$abs(x) \sim \max(|x_{real}|, |x_{imag}|) + 0.5 * \min(|x_{real}|, |x_{imag}|) \quad \text{Equation 1}$$

The use of the approximated absolute value in accordance with Equation 1 reduces the hardware required in this implementation and causes no significant performance degradation. Once the approximated absolute values have been determined by the AVMs 23, 24, respectively, the modified even and odd samples are output to a decision circuit 25.

Figure 2:
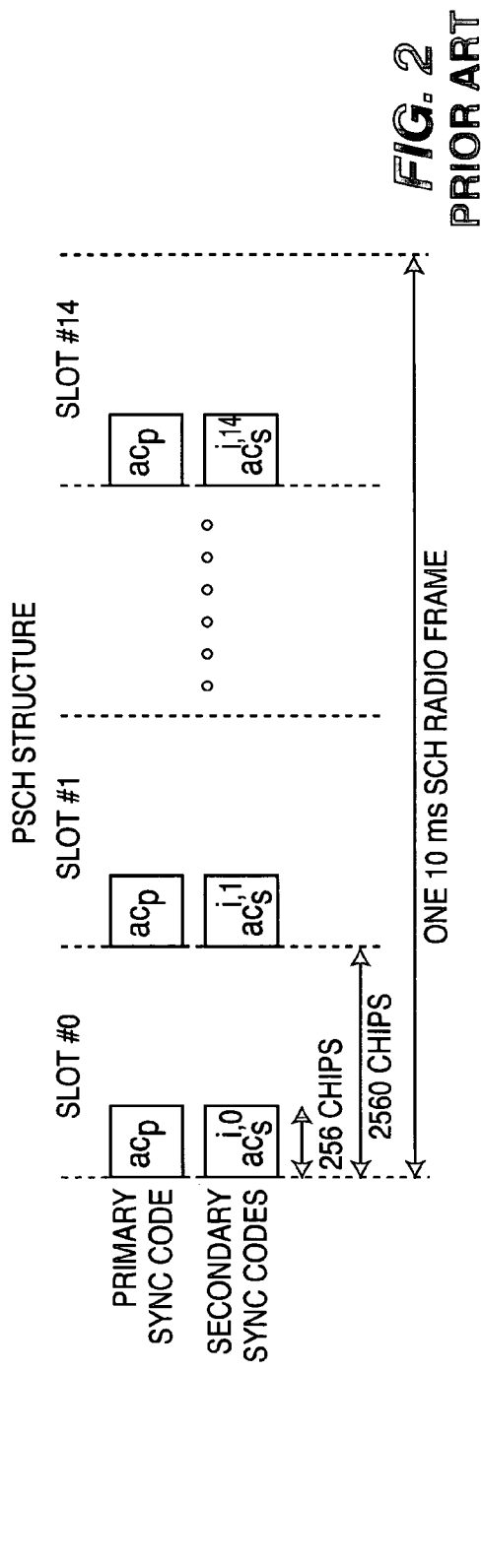
FIG. 2 is an illustration of the physical synchronization channel (PSCH).

The decision circuit 25, coupled to the AVMs 23, 24 and the controller 18, determine the chip offset. The modified even and odd samples output from the AVMs 23, 24 are input into a MUX 8 within the decision circuit 25, and combined into a single stream. This stream is a representation of the strength of the signal transmitted in one of the samples of each slot of each frame. As illustrated in FIG. 2, there are two thousand five hundred and sixty (2560) chips in each slot and fifteen (15) slots in each frame. Since the input signal is sampled at twice the chip rate, there are 5120 samples in each slot. Therefore, the decision circuit 25 determines the location of the PSC in the signal, chip offset, by sweeping through the 5120 accumulated samples at the end of each slot.

The stream generated by the MUX is forwarded to an accumulator (not shown) within the decision circuit 25. This accumulator has a five thousand one hundred and twenty (5120) sample long register which stores the accumulated sample value for each slot of every frame, and operates on the slot rate. The strength of the signal for each sample in a slot is added to the strength of the signal of each sample in every subsequent slot. As an example, the samples of slot 1 comprise the following signal strength values {1,5,3,7}; the samples of slot 2 comprise the following signal strength values {2,4,8,3}. Initially, the registers of the accumulator have the values {0,0,0,0}. As each sample value from slot 1 is added to the registers of the accumulator, the register values change accordingly. For instance, when the first sample value of slot 1 is added to the first register value, the accumulator has the values {1,0,0,0}; when the second sample value of slot 1 is added to the second register value, the accumulator has the values {1,5,0,0} and so on. Once the last sample value of slot 1 is added to the accumulator, the first sample value of slot 2 is added to the first register of the accumulator, resulting in the accumulator having the values {3,5,3,7}; when the second sample value of slot 2 is added to the second register value, the accumulator has the values {3,9,3,7}. The preferred embodiment of the present invention, flushes the registers of the accumulator after five (5) frames have been accumulated, which is equivalent to seventy five (75) slots. The number of accumulated frames is counted by a step 1 counter (not shown) within the decision circuit 25.

A decision, determination of the chip offset, by the decision circuit 25 is generated at the end of each frame, fifteen (15) slots. The decision circuit 25 determines which register in the accumulator has the maximum accumulated sample value MAX and assigns an index to it. The index corresponds to the half chip location of the PSC signal for the base station with the strongest signal.

Chip offset assignment is determined using the HGC offset value of 511. As those skilled in the art know, the output of the HGC are delayed by 256 chips. Therefore, when the decision circuit 25 assigns an index in the peak sample, the HGC offset value must be subtracted. Since the PSC is 256 chips long, 512 samples long, subtracting the HGC offset from the index equates to setting the chip offset to the beginning of the slot. If the index generated by the decision circuit 25 is greater than the HGC offset value of 511 then the chip offset is calculated in accordance with Equation 2 below:

$$\text{chip\_offset} = \text{INDEX} - 511 \quad \text{Equation 2}$$

If the index is less than the HGC offset value then the chip offset is calculated in accordance with Equation 3 below:

$$\text{chip\_offset} = 5120 + \text{INDEX} - 511 \quad \text{Equation 3}$$

As illustrated in FIG. 3, the decision circuit 25 also comprises a mask generator 5, which is used to exclude a window around a rejected chip offset from detection by the decision circuit 25. This mask generator 5, therefore, prohibits the decision circuit 25 from utilizing an index associated with a rejected chip offset. The details of the mask generator 5 will be disclosed hereinafter.

The calculated chip offset and the frame count step 1 counter are output to a controller 18, to be disclosed hereinafter. The decision circuit 25 also outputs the maximum accumulated chip value MAX and the accumulated chip value OUTPUT for all registers.

The accumulated chip value OUTPUT for all registers is output to a normalizer circuit 26, where it is sampled at 20% the chip rate (one out of five), summed, and then normalized to 1024. The frame count step 1 counter is output to the lookup table 27 to determine the proper gain factor based on the number of frames accumulated. The output of the normalizer circuit 26 and the lookup table 27 are then multiplied by the multiplier 28. The output of the multiplier 28 is considered the Noise Threshold and is forwarded to a step 1 comparator circuit 29, to be compared to the maximum accumulated sample value MAX. If the maximum accumulated sample value MAX is greater than the Noise Threshold, the differential amplifier 29 outputs a high step 1 firm signal to the controller, indicating a good decision for step 1, otherwise a low signal is output.

As stated earlier, the chip offset and other outputs are determined at the end of every frame. Therefore, the reliability of the first decision is less than that of the second because the second decision is made over thirty slots instead of fifteen slots. The reliability increases as the number of slots accumulated increases. The highest reliable output is generated at the M1th frame, M1 being an integer greater than or equal to one (1). The controller 18 resets the frame count step 1 counter and the accumulator registers at the end of every M1th frame. The performance results under different channel impairment show that five-frame integration is good enough to detect PSC. However, this integration can be changed to more or less frames.

Figure 4:
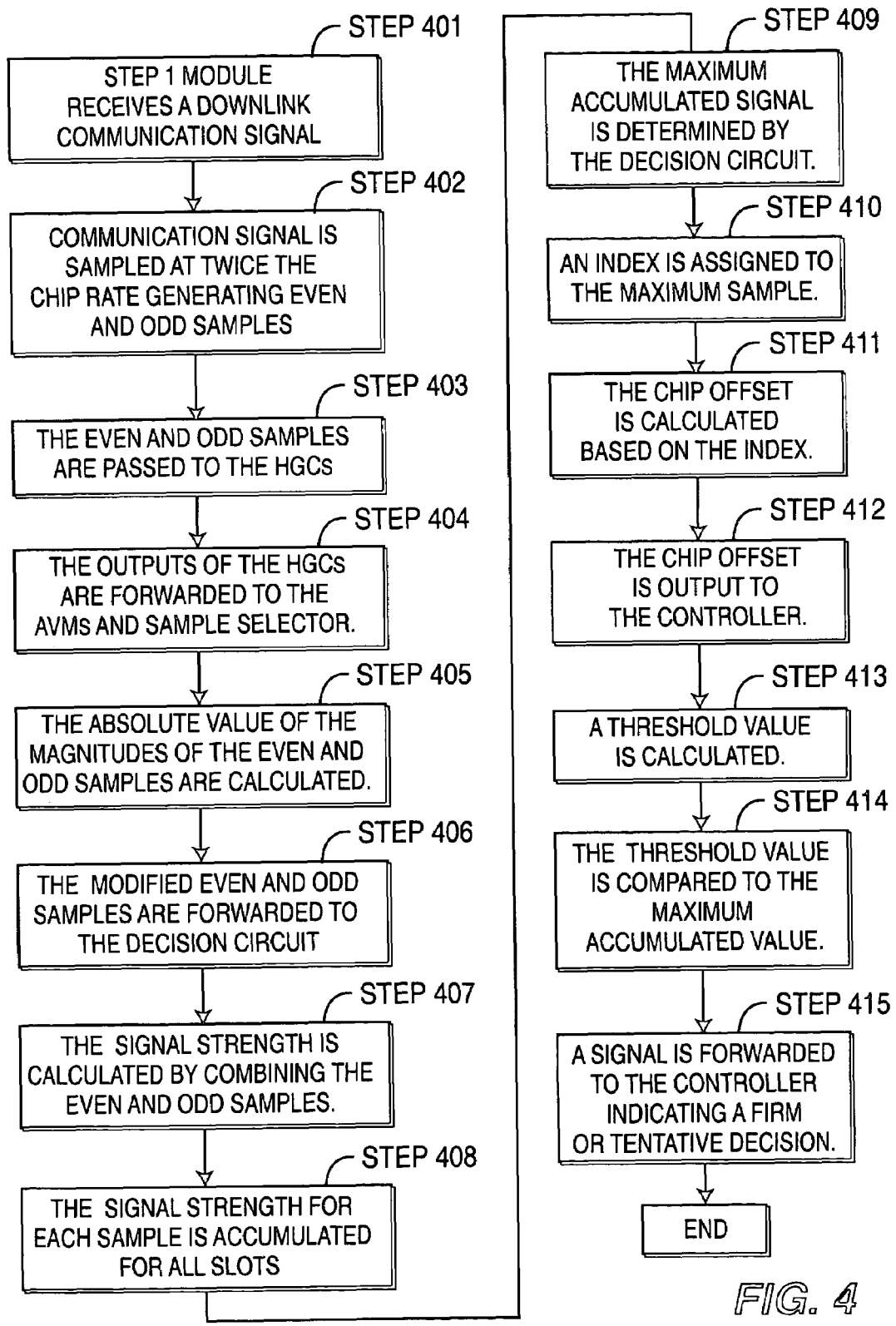
FIG. 4 is a flow diagram of the step 1 module in accordance with the preferred embodiment of the present invention.

A flow diagram of the step 1 module is illustrated in FIG. 4. The UE detects the receipt of communications over the common downlink channel (step 401) and samples the signal at twice the chip rate generating even and odd samples (step 402). These even and odd samples are passed to the hierarchical Golay correlators (HGC) 21, 22 (step 403). The HGCs 21, 22 then forwards the outputs to the AVMs 23, 24 and sample selector 34 (step 404). The AVMs 23, 24 approximate the magnitudes of the even and odd outputs received from the HGCs 21, 22 (step 405) and forwards them to the decision circuit 25 (step 406). Upon receipt of the output magnitudes the decision circuit 25 combines the magnitudes (step 407), which represents the signal strength of the signal transmitted in one of the samples of each slot of each frame. The signal strength for each sample is accumulated for all slots within each frame (step 408). The decision circuit 25 then determines which sample in the frame has the maximum accumulated sample value (step 409) and assigns an index to it (step 410). Based on the index, a chip value is assigned to the index (step 411), known as the chip offset, and output to the controller 18 (step 412). A noise threshold value is then generated using the accumulated chip value for all samples and the frame count (step 413) and then compared to the maximum accumulated sample value (step 414), indicating a firm or tentative decision to the controller 18 (step 415).

Referring back to FIG. 1, the outputs of the step 1 module 12, the chip offset, step 1 firm, and step 1 counter, are forwarded to the controller 18. The controller 18 forwards the chip offset to the step 2 module 14. As stated above, the step 2 module 14 utilizes a step 2 algorithm which takes the chip offset output from step 1 and the HGC 21, 22 outputs and detects the slot offset and the code group number. The step 2 module 14 illustrated in FIG. 5, comprises a step 2 comparator 30, a delay 32, a sample selector 34, a conjugator 36, a complex multiplier 38, a Fast Hadamard Transform (FHT) 33, an envelope remover 31, an input matrix generator 35, an RS encoder 37, and a step 2 decision circuit 39.

The purpose of the step 2 algorithm is to provide the step 3 algorithm with the scrambling code group number and the slot offset. The chip offset from the step 1 module 12 is sent from the controller 18 to a delay 32 of the step 2 module 14. The chip offset is delayed for a frame through the delay 32 in order to allow the step 1 module to make a first decision. The delayed chip offset is then forwarded to the sample selector 34 which is coupled to the delay 32, a conjugator 36 and the HGCs 21, 22 of the step 1 module 12. Using the index determined by the decision circuit 25, the sample selector 34 extracts the peak HGC 21, 22 outputs from the input signal, which are then conjugated by the conjugator 36 and output to the complex multiplier 38.

The same communication signal to the step 1 module 12 is input to an alignment circuit 15, which aligns the input signal so that step 2 module 14 begins it search for the scrambling code group number and slot offset at the beginning of the slot. Once the signal is aligned, the alignment circuit 15 forwards it to the step 2 module 14. Even though there are two thousand five hundred and sixty (2,560) chips in each slot, it should be apparent from FIG. 2 that the PSC is located within the first 256 chips of each slot. Since the chip offset has been determined by the step 1 module, the step 2 module determines the SSC using the location of the strongest PSC in the first 256 chips in each slot. As those skilled in the art know, when SSC codes are generated, an envelope sequence is applied to the rows of an Hadamard matrix in order to have some orthogonality between PSC and SSC codes. This envelope has to be removed before proceeding into the remaining portion of the step 2 algorithm. This envelope removal is accomplished by the envelope remover 31.

Figure 6:
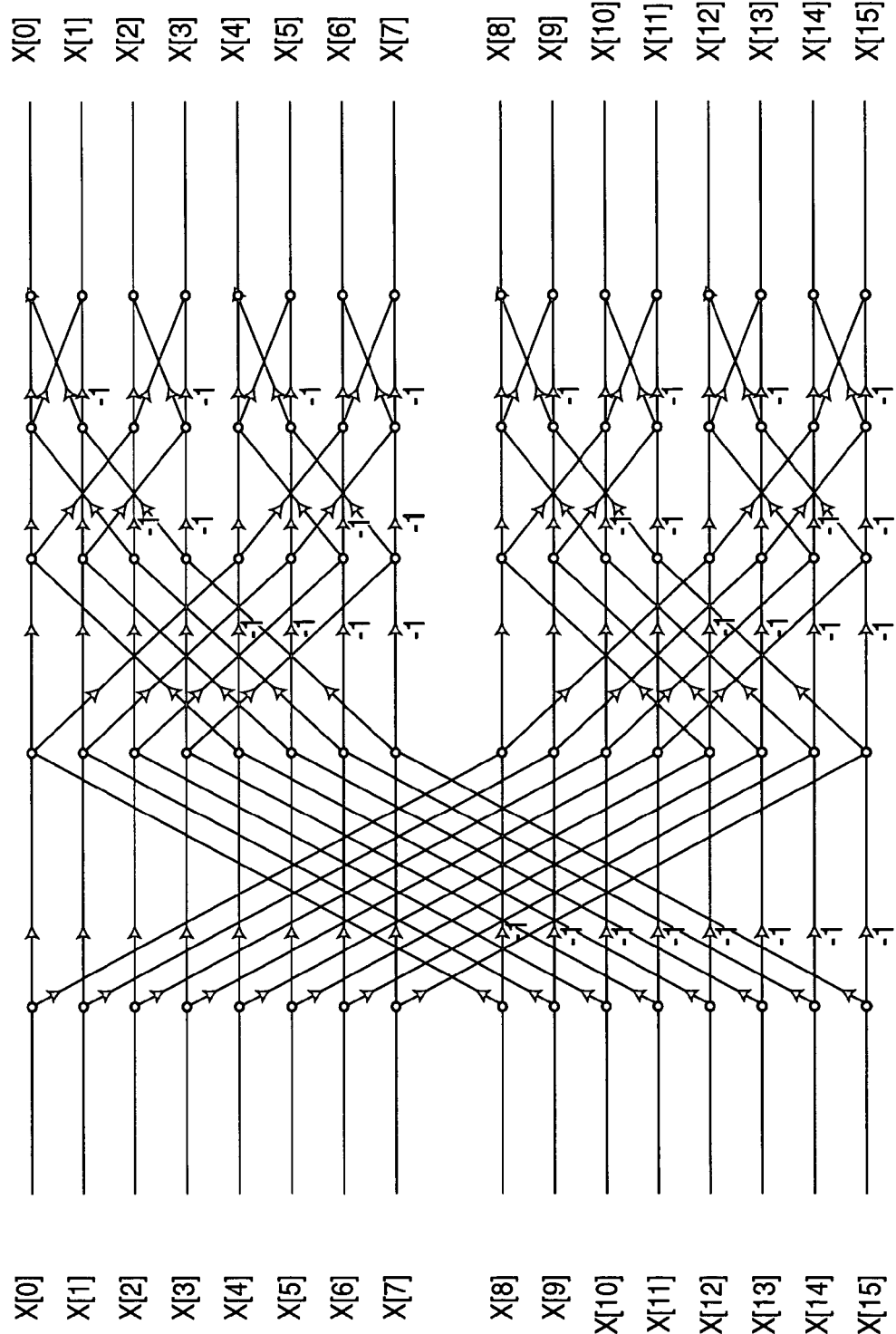
FIG. 6 is a graphical illustration of the Fast Hadamard Transform (FHT) structure.

Once the envelope has been removed from the input signal, the signal is output from the envelope remover 31 to the FHT transform 33 coupled to the envelope remove 31 and multiplier 38, which reduces the complexity of the pure Hadamard correlation operation. FIG. 6 is an illustration of the FHT structure. The output of the FHT transform 33 is multiplied by the conjugate of the peak HGC 21, 22 by the complex multiplier 38 coupled to the conjugator 36 and the FHT transform 33. The use of the conjugate of the peak output from the HGCs 21, 22 provides a phase correction to the FHT output and transforms the one entry that corresponds to the transmitted SSC code onto the real axis.

Once the FHT transform 33 output has been multiplied in the complex multiplier 38, the real part of the FHT outputs are forwarded to the input matrix generator 35 by the multiplier 38, which puts the FHT outputs into a real matrix of 15×16, called the input matrix. In the input matrix, there are fifteen (15) slots and in each slot sixteen (16) elements for a frame. The input matrix is updated per frame. The input matrix is then forwarded to the decision circuit 39 where a determination of the slot offset and code group number are made. The structure of the input matrix is illustrated in FIG. 7.

A correlation matrix is generated within the step 2 decision circuit 39 using the input matrix 35 and a known code group matrix, which results in a 64×15 matrix. The correlation matrix is reset when the frame counter for the step 2 module reaches M2, similar to that disclosed in the step 1 module. In order to generate the correlation matrix, the decision circuit 39 steps through each of the elements of the code group matrix and the elements of the input matrix 35 in accordance with the equation 4 below:

$$corrMatrix[i][j] += inputMatrix[k][code\_group\_matrix[i][k]] \quad \text{Equation 4}$$

where j is an integer incremented from 0 to 14 by 1, that represents cyclic shifts performed on the identity matrix with respect to columns; i is an integer incremented from 0 to 63 by 1; and k is an integer incremented from 0 to 14 by 1. The structure of the code group matrix and the resulting correlation matrix are illustrated in FIGS. 8 and 9 respectively. Once the correlation matrix has been generated, the maximum entry is found by the decision circuit 39. The corresponding row of the found maximum entry is the code group number and the column is the slot offset.

Similar to the step 1 module 12, if the max correlation MAX 2 is greater than the threshold, the comparator circuit 30 will output a high step 2 firm signal to the controller 18 indicating a firm decision, otherwise a low signal is output indicating a tentative decision. The threshold value is calculated using the mean magnitude value of the correlation matrix:

$$Th = k \frac{1}{960} \left( \sum_{i=0}^{63} \sum_{j=0}^{14} mag(c_{ij}) \right) \quad \text{Equation 5}$$

$$k = 5.12, P_{fa} = 10^{-4}$$

where $P_{FA}$ is the probability of false alarm. The step 2 module 14 outputs to the controller 18 the code group number, slot offset, step 2 firm, and step 2 counter.

Figure 10A:
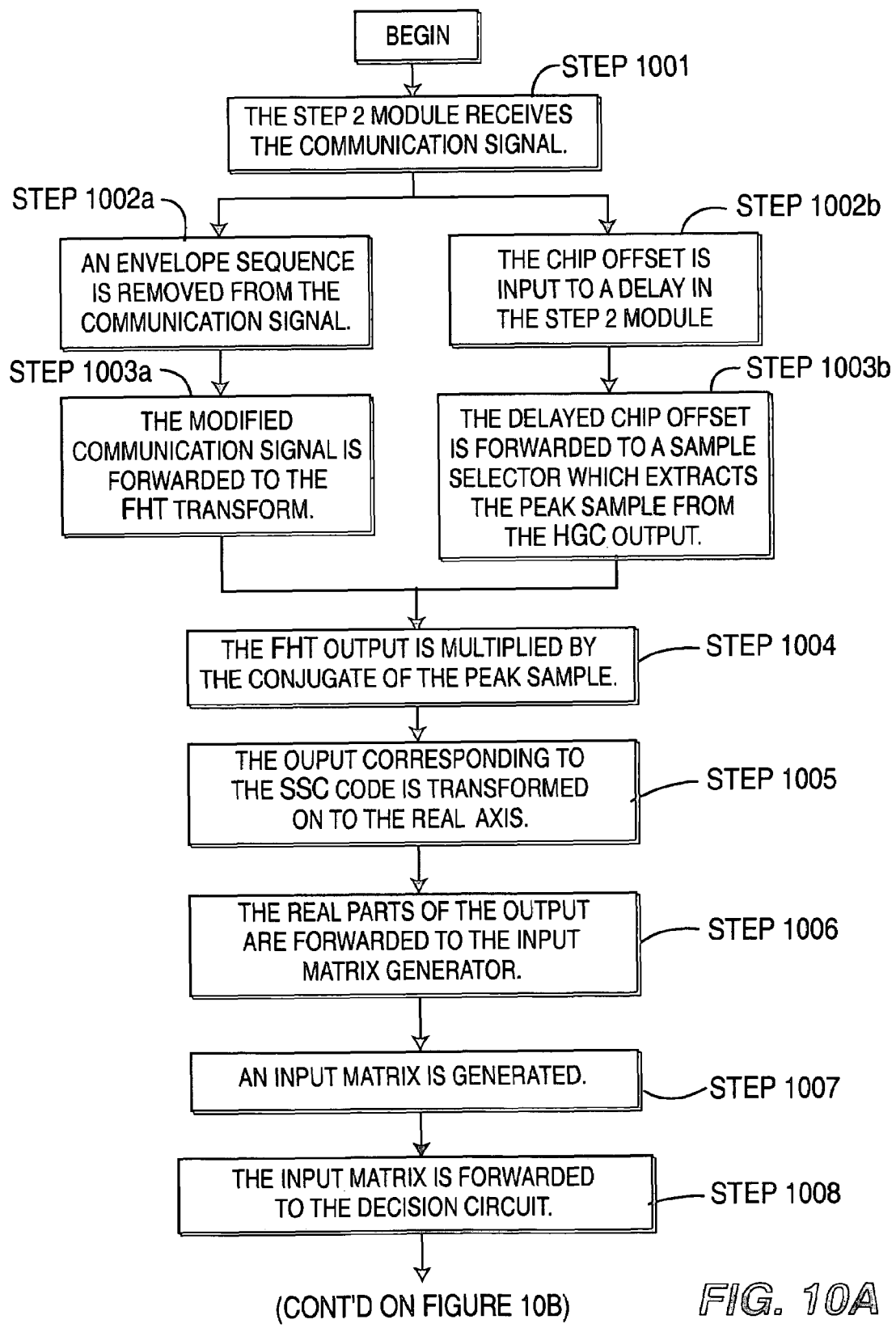
FIGS. 10A and 10B show a flow diagram of the step 2 algorithm in accordance with the preferred embodiment of the present invention.
Figure 10B:
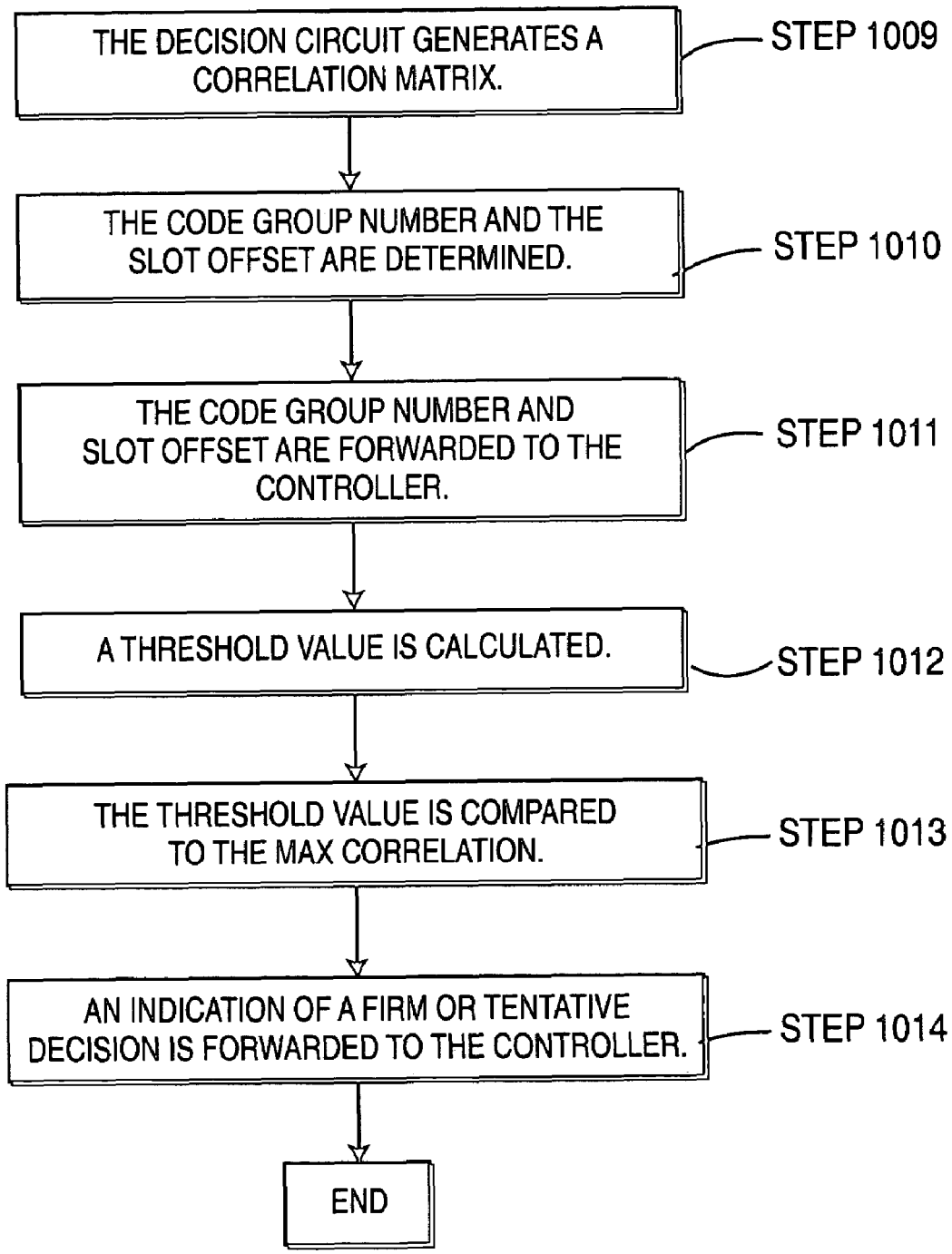

The flow diagram for the step 2 algorithm is illustrated in FIG. 10. The step 2 module receives the communication signal from the base station over the downlink channel (step 1001). An envelope sequence is removed from the communication signal (step 1002a) and output to an FHT transform 33, (step 1003a). At the same time, the chip offset from the step 1 module 12 is input to a delay 32 in the step 2 module 14 (step 1002b) and forwarded to a sample selector 34, which extracts the peak even or odd output generated by the HGCs 21, 22 of the step 1 module 12 based on the chip offset (step 1003b). The output of the FHT transformer 33 is then multiplied by the conjugate of the peak even or odd sample output from the sample selector 34 (step 1004) and transforms one entry of the FHT output that corresponds to the SSC code onto the real axis (step 1005). The real part of the FHT outputs for each slot in a frame are forwarded to the input matrix generator 35 (step 1006). The input matrix generator 35 then creates the input matrix (step 1007). The input matrix is then forwarded to the decision circuit 39 to determine the slot offset and code group number (step 1008). Utilizing the input matrix and known code group matrix, the decision circuit 39 generates a correlation matrix (step 1009). Once the correlation matrix has been generated, the decision circuit 39 locates the maximum entry in the correlation matrix (step 1010), for which the corresponding row of the found maximum entry is determined to be the code group number and the column is the slot offset. The code group number and the slot offset are then forwarded to the controller 18 (step 1011). A threshold value is then calculated using the mean magnitude value of the correlation matrix (step 1012) and compared to the max correlation (step 1013), forwarding an indication of a firm or tentative decision to the controller 18 (step 1014).

The chip offset output from the step 1 module 12 and the slot offset and code group number output from the step 2 module, are forwarded by the controller 18 to the step 3 module 16, which utilizes a step 3 algorithm for the purpose of determining which one of the primary scrambling codes is coming with the least probability of false alarm (PFA) when the code group number is given. There are eight primary scrambling codes in each code group.

Figure 11:
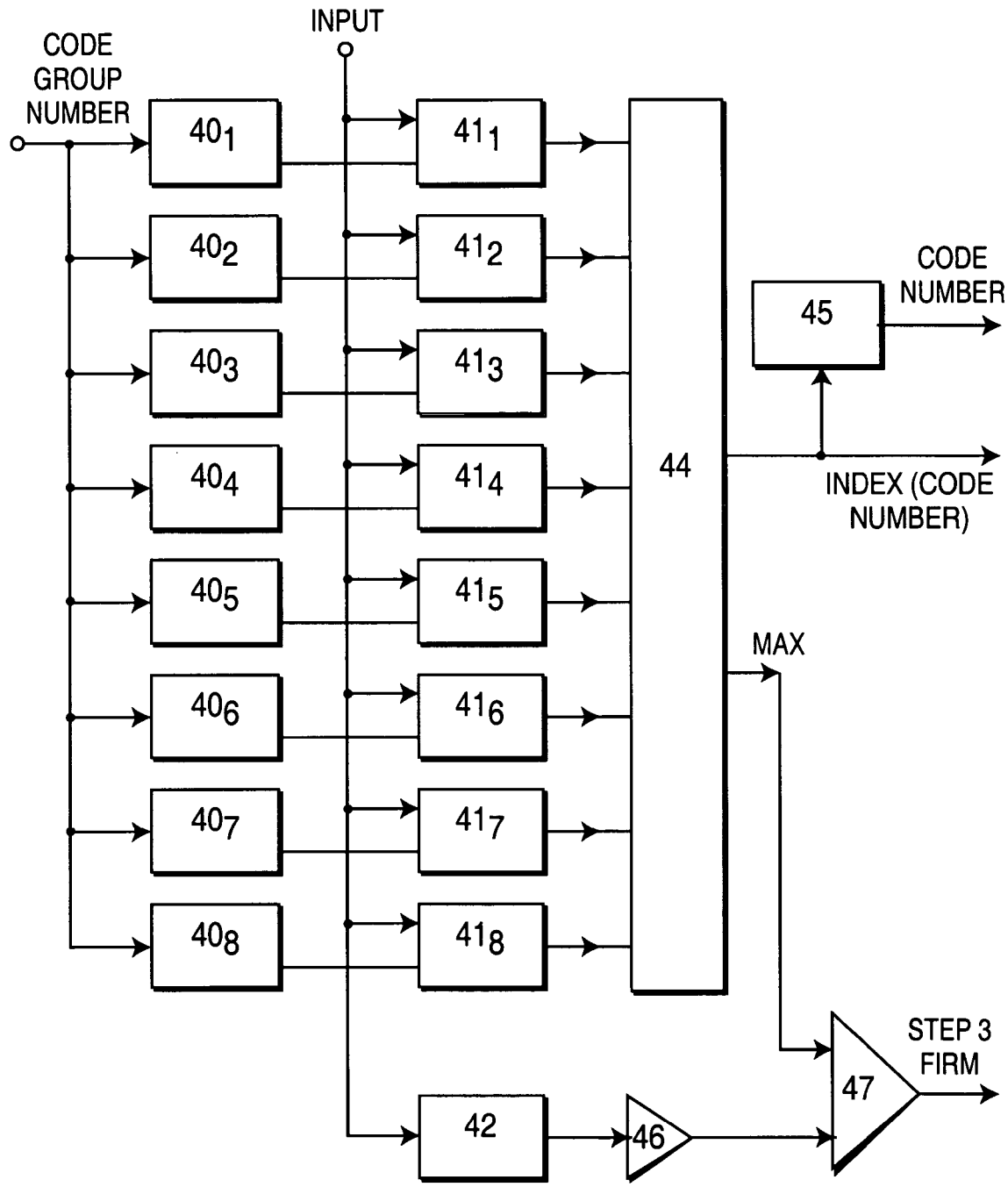
FIG. 11 is a block diagram of the step 3 module in accordance with the preferred embodiment of the present invention.

The block diagram of the step 3 module 16 is illustrated in FIG. 11. Similar to the step 2 module 14, the communication signal is input to a second alignment circuit 18 which aligns the output signal so that the step 3 module 16 begins its search for the scrambling code number at the beginning of the frame. Once the input signal has been aligned, the alignment circuit 18 forwards the input signal to the step 3 module 16. The step 3 module comprises eight (8) scrambling code generators $40_1 \ldots 40_8$, eight (8) correlator circuits $41_1 \ldots 41_8$, a noise estimator circuit 42, a step 3 decision circuit 44, a decision support circuit 45, a gain circuit 46, and a comparator circuit 47. The code group number generated by the step 2 module 14 is input to the eight (8) scrambling code generators $40_1 \ldots 40_8$ and scrambling codes are generated therefrom. The output of the scrambling code generators $40_1 \ldots 40_8$ is forwarded to the scrambling code correlators $41_1 \ldots 41_8$, respectively.

Figure 12:
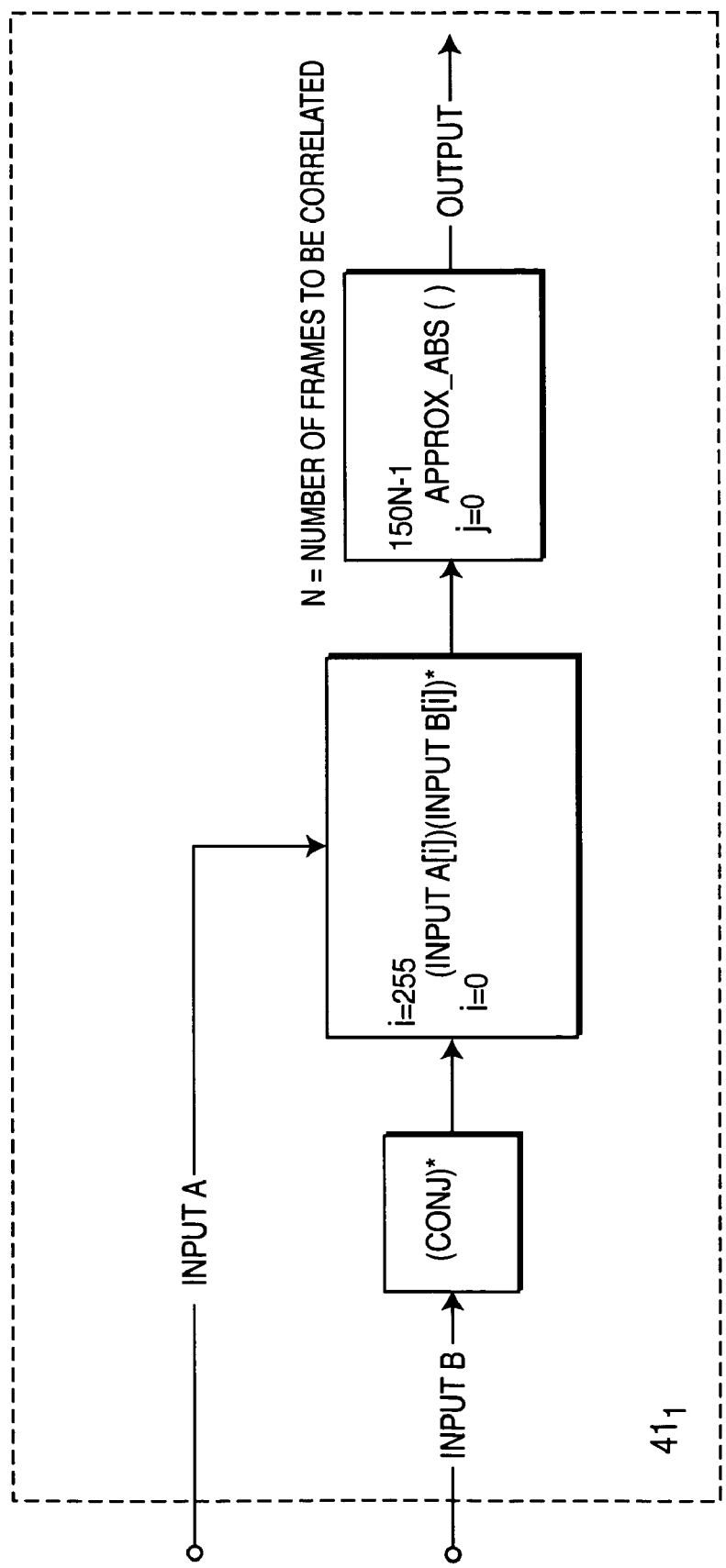
FIG. 12 is a block diagram of the step 3 correlator in accordance with the preferred embodiment of the present invention.

Along with the scrambling codes output from the scrambling code generators $40_1 \ldots 40_8$, the communication signal, after processing by a realignment circuit 15 using the chip offset and slot offset output from the controller 18, is input to the correlators $41_1 \ldots 41_8$. The correlators $41_1 \ldots 41_8$ utilize non-coherent integration over a certain number of slots. Integration can be over multiple frames. The correlation is made coherently for each symbol that corresponds to the 256-chip data. The absolute value of the correlation results are accumulated over 10*N symbols per frame, where N is the number of slots to be accumulated from the beginning of a frame. In a single slot there are ten 256-chip long data parts; therefore, ten 256-chip coherent correlation and ten accumulations are made per slot. FIG. 12 shows the details of a correlator $41_1$.

After the correlators $41_1 \ldots 41_8$ generate the outputs, the maximum output and its index have to be found. The step 3 decision circuit 44 takes the outputs of the scrambled code correlators $41_1 \ldots 41_8$, determines the correlator $41_1 \ldots 41_8$ with the maximum output, and generates an index thereof. The index is the scrambling code number. The scrambling code number is then forwarded to the decision support circuit 45 and the controller 18. The decision support circuit 45 observes the last M3 decisions made by the decision circuit 44. If a code repeats itself more than k repetitions out of M3 inputs, then the code that has been repeated is the scrambling code number that is output from the decision support circuit 45 to the controller 18. However, the output of the decision support circuit 45 is only utilized when there is no firm decision over the consecutive M3 frames. Even though the decision support circuit is only illustrated in the step 3 module 16, a decision support circuit 45 as disclosed in the step 3 module 16 can be utilized for both the step 1 and step 2 modules 12, 14 disclosed herein above.

A firm decision is indicated when the determined maximum correlation value is greater than the calculated threshold value. The threshold value is calculated using the noise estimator circuit 42, which is used for noise measurement, and a gain factor. The noise is determined by taking the magnitude of the difference between the successive common pilot symbols. This method of noise estimation eliminates any bias in the noise estimate due to orthogonal signal interference. The result of the noise estimator 42 is multiplied by the gain factor in the multiplier 46, which is determined to be the threshold. When the determined maximum correlation is greater than the calculated threshold, the comparator 47 outputs a high step 3 firm signal indicating a firm decision, otherwise a low signal is generated indicating a tentative decision.

Figure 13A:
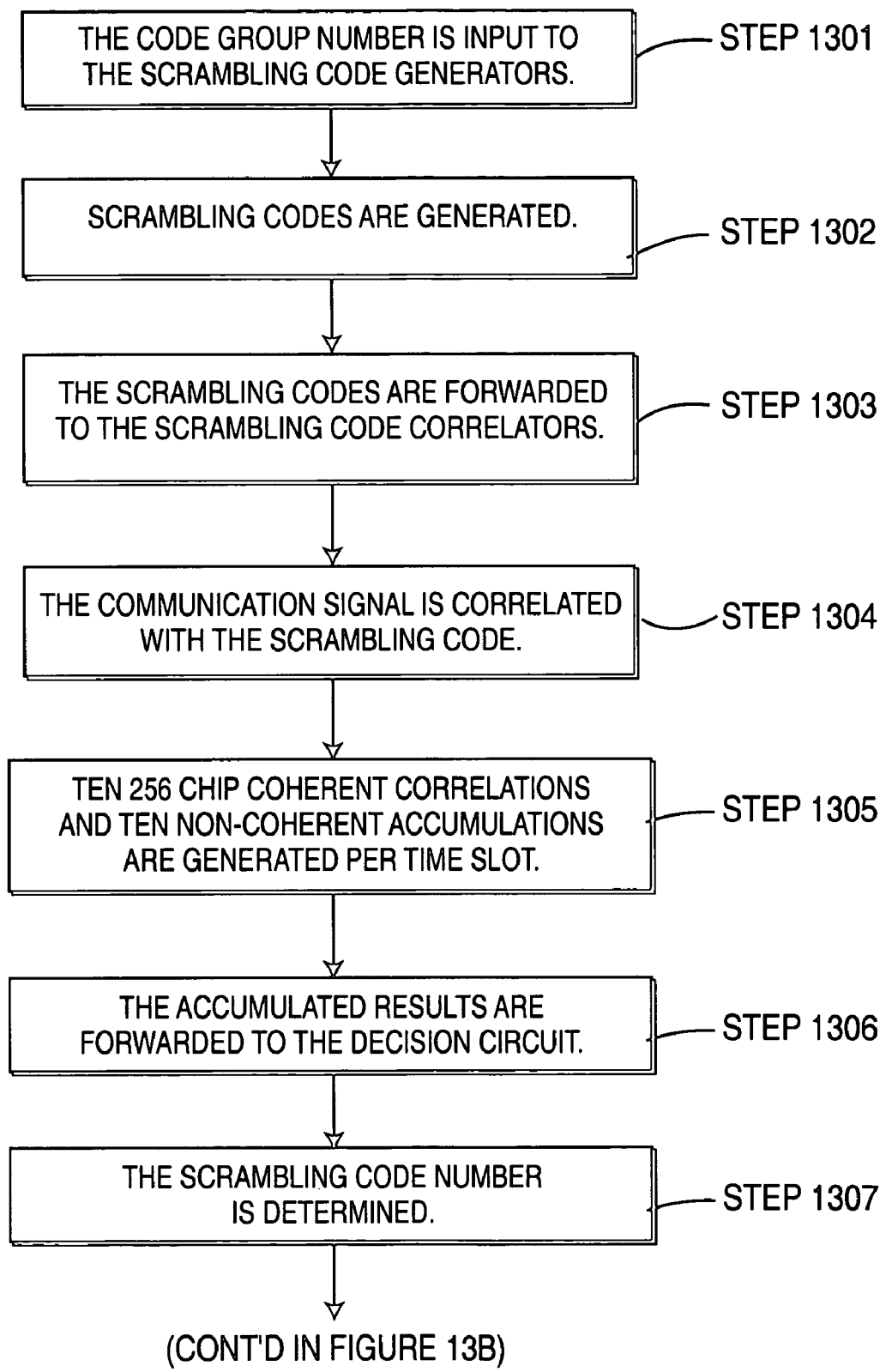
FIGS. 13A and 13B are a flow diagram of the step 3 algorithm in accordance with the preferred embodiment of the present invention.
Figure 13B:
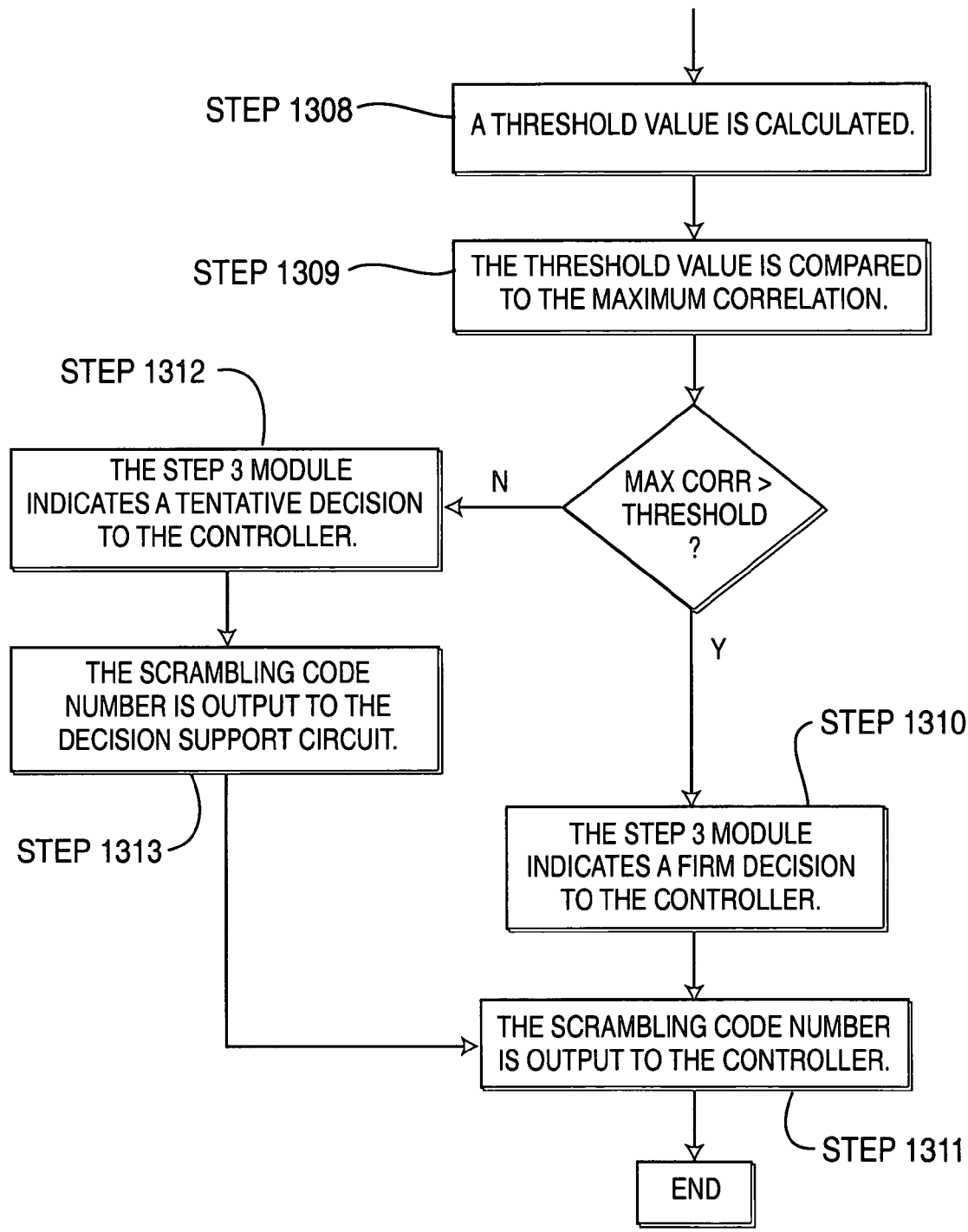

The flow diagram of the step 3 algorithm is illustrated in FIG. 13. The code group number output from the step 2 module 14 is input to the step 3 module 16 scrambling code generators $40_1 \ldots 40_8$ (step 1301), which then generate scrambling codes therefrom (step 1302). The output of the scrambling code generators is then forwarded to the scrambling code correlators $41_1 \ldots 41_8$ (step 1303). Along with the scrambling codes output from the scrambling code generators $40_1 \ldots 40_8$, the communication signal is correlated in the scrambling code correlators $41_1 \ldots 41_8$ (step 1304), which then generate ten 256 chip coherent correlations and ten non-coherent accumulations per time slot (step 1305). The accumulated results are forwarded to the step 3 decision circuit 44 (step 1306). The decision circuit 44 determines the correlator with the maximum output and generates an index thereof, which is the scrambling code number (step 1307). A threshold value is then calculated (step 1308) and compared to the maximum correlation value (step 1309). If the maximum correlation value is greater than the calculated threshold, the step 3 module 16 outputs a high step 3 firm signal (step 1310), which results in the decision circuit 44 outputting the scrambling code number to the controller 18 (step 1311). Otherwise, a low signal is output to the controller 18 (step 1312) and the scrambling code number is output to the decision support circuit 45 (step 1313). Since the decision support circuit 45 observes the last M3 decisions made by the decision circuit 44, a scrambling code number is output to the controller 18 when a scrambling code repeats itself k times out of M3 inputs (step 1311).

Referring back to FIG. 1, the controller 18 comprises a rejected chip offset buffer 9, a rejected chip offset counter 11, a rejected primary scrambling code vector buffer 13, a rejected primary scrambling code counter 3, a decision logic circuit 2 and a window exclusion logic circuit 6. The controller 18 is used to make better decisions during the entire cell search algorithm in accordance with the preferred embodiment of the present invention.

Figure 14A:
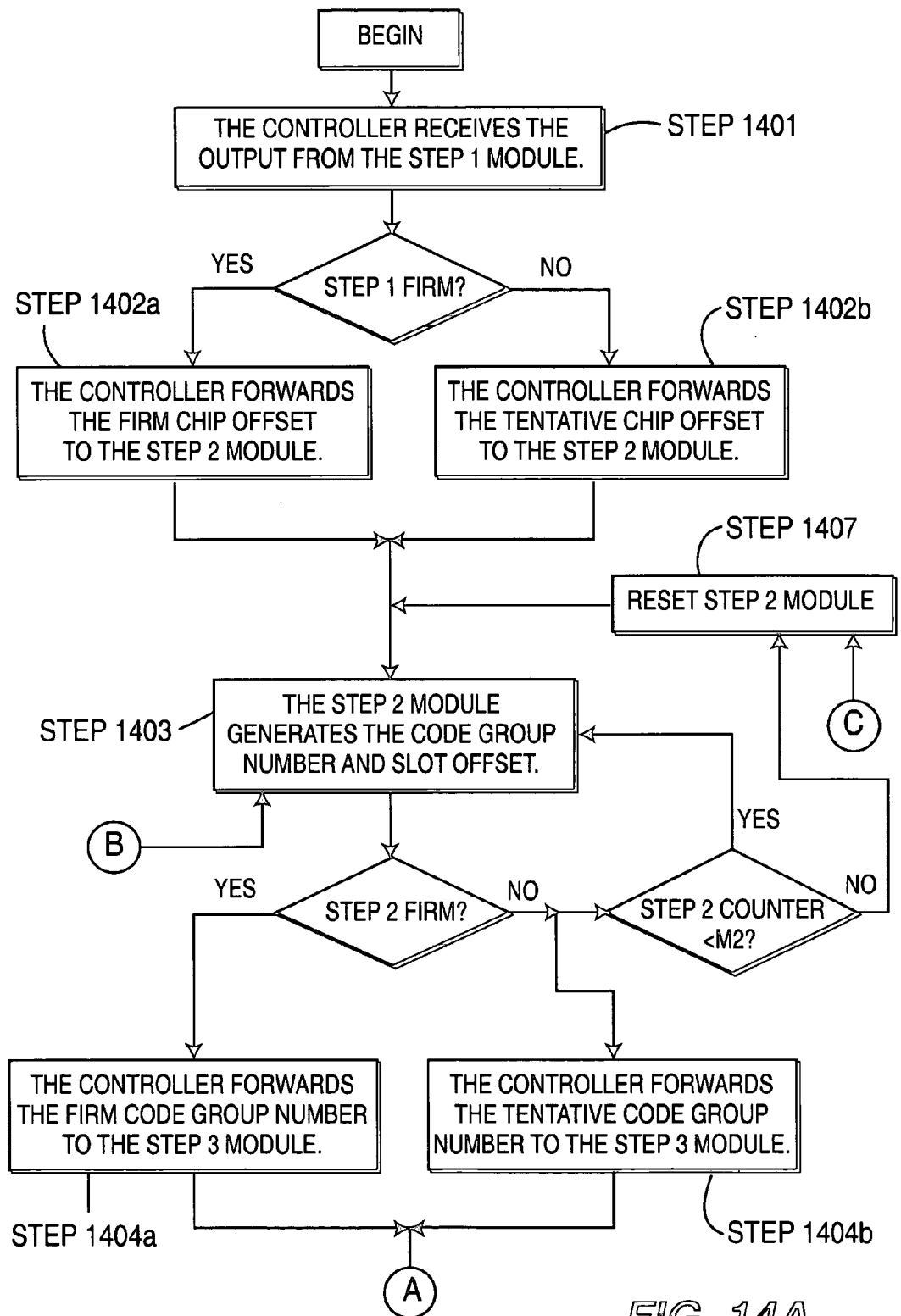
FIGS. 14A and 14B show a flow diagram of the controller cell search decision logic in accordance with the preferred embodiment of the present invention.
Figure 14B:
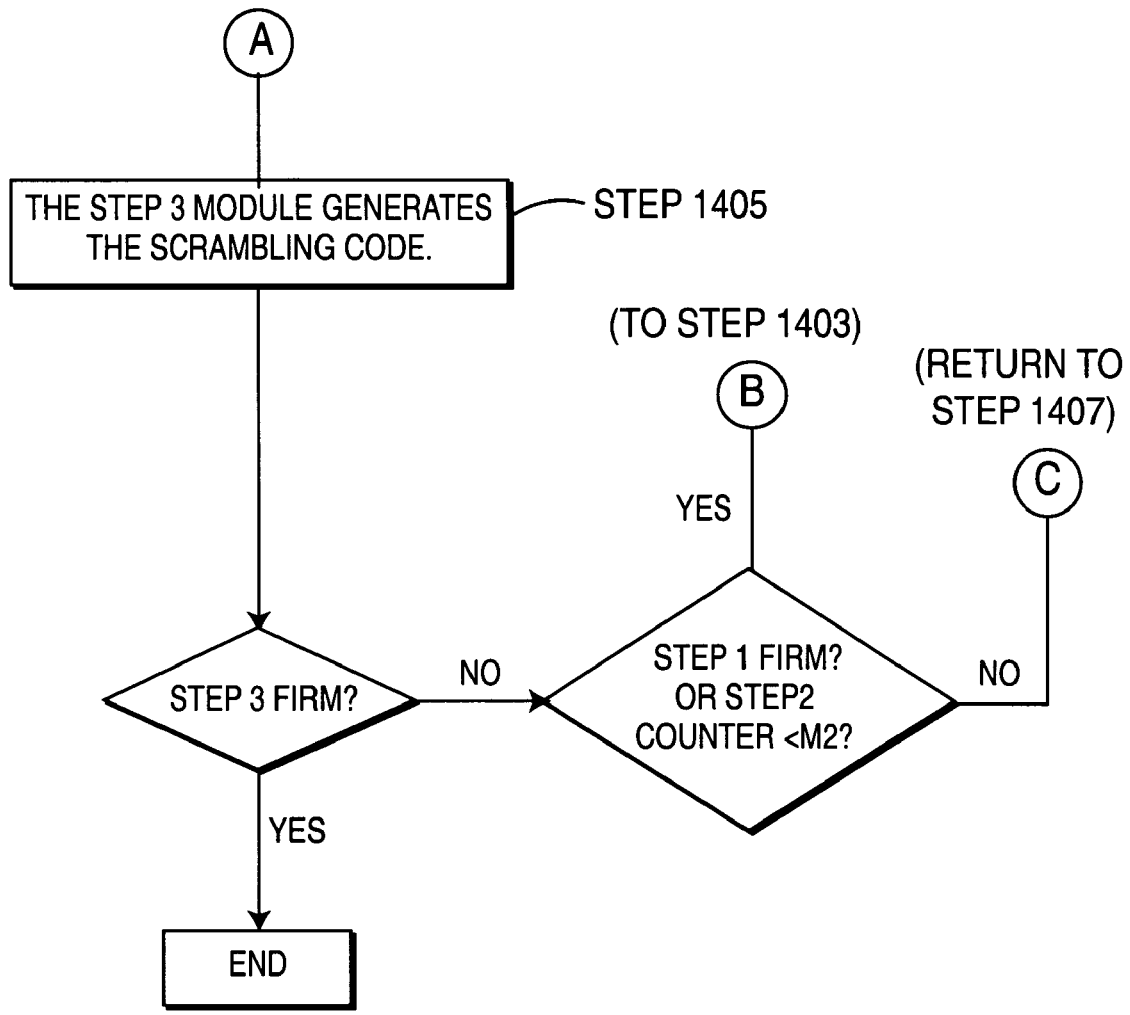

The flow diagram of the decision logic used by the controller 18 to determine the primary scrambling code for synchronization with the transmitting base station is illustrated in FIG. 14. The controller 18 receives the chip offset, the step 1 firm signal and the step 1 counter signal from the step 1 module 12 (step 1401). If the step 1 firm signal is high, the controller 18 forwards the firm chip offset to the step 2 module 14 (step 1402a), otherwise a tentative chip offset is forwarded (step 1402b). The step 2 module 14 generates the code group number, slot offset value, step 2 firm, and step 2 counter (step 1403). If the step 2 firm signal is high, the controller forwards the firm code group to the step 3 module (step 1404a). Otherwise, the controller 18 forwards a tentative code group to the step 3 module 16 (step 1404b) and if the step 2 counter is less than M2, the step 2 module 14 continues to generate the code group number (step 1403). If the step 2 counter is equal to M2, then the step 2 module 14 is reset (step 1407), which results in the step 2 module generating a code number and slot offset (step 1403). The step 3 module 16 then generates a scrambling code number and step 3 firm signal (step 1405) generated in step 1403, receiving the slot offset and code group number. If the step 3 firm signal is high, then the decision logic circuit 2 determines that the scrambling code number is firm and ends the decision logic process. If the step 3 firm signal is low and the step 1 firm signal is high or the step 2 counter is less than M2, the step 2 module continues to generate a code group number (step 1403). Otherwise, the step 2 module receives a reset signal from controller 18 and resets the step 2 counter to 0 (step 1407). This procedure continues until the decision output by the step 3 module 16 is firm.

Due to a possible initial frequency error in the VCO, excess loss of signal correlation may occur. Therefore, the VCO is frequency stepped in order to control the maximum possible frequency error between the UE and the cell. Upon initialization of the UE, the controller 18 initializes the cell search frequency using the frequency synthesizer 20. Referring to FIG. 1, the frequency synthesizer 20 comprises an adaptive frequency circuit (AFC) 4 and a voltage controlled oscillator (VCO) 7 or numerically controlled oscillator (NCO). The AFC 4, coupled to the controller 18 and the VCO 7, comprises a frequency allocation table (FAT) and a frequency step table (FST).

When the controller 18 is initialized, the AFC 4 sets the frequency using the first frequency in the FAT and the offset value from the FST. This initial frequency is the frequency used by the controller 18 to conduct the cell search. The FST is a table of step frequencies, or offset frequencies, for example $\{0, 2, -2, 4, -4, 6, -6 \ldots N, -N\}$ which are used to offset the frequency in use by the controller 18. The FAT includes a plurality of predetermined frequencies for which the controller 18, or a level 1 controller (not shown) utilize to locate and synchronize the UE to the base station. For purposes of this disclosure, the plurality of frequencies listed are defined as $F_0, F_1, F_2 \ldots F_N$ in the FAT and the offset frequencies in the FST are defined as $SF_0, SF_1, -SF_1, SF_2 - SF_2 \ldots$ $SF_N, -SF_N$. Accordingly, when the controller is initialized, the offset frequency is SFO and the frequency>$F_0$. The AFC 4 combines the two values $F_0+SF_0$, and forwards the resulting frequency value to the VCO or NCO 7, which maintains the UE frequency at this forwarded frequency.

The controller 18 performs the decision logic disclosed above. If after X number of frames the output step 3 firm does not go high, the controller signals the AFC 4 to step 2 the next offset in the FST, for example, $SF_1$. The AFC 4 then combines the new offset frequency with the frequency of the FAT, $F_0+SF_1$, and outputs the resulting frequency to the VCO or NCO 7 to maintain the UE at this frequency.

The controller 18 continues to step through the offset frequencies in the FST until a high signal is detected from the step 3 module 16, indicating a firm detection or until all offset frequencies have been tried by the controller 18. Once all of the offset frequencies have been tried, the AFC 4 resets the FST offset frequency to $SF_0$, steps to the next frequency in the FAT, $F_1$ and combines the two values, $F_1+SF_0$, for output to the VCO or NCO 7. The VCO or NCO 7 then regulates the UE frequency to this new resulting frequency and the controller 18 then performs the decision logic until a high signal is detected from the step 3 module 16. This process of stepping through the FST and then stepping to the next FAT frequency is continued until a high signal is output by the step 3 module 16. Once this event occurs the detection of a scrambling code, the AFC 4 locks the FST offset value at its current position, not to be readjusted until the controller 18 is initialized.

As those skilled in the art know, most service providers in a communication system have a different public land mobile network (PLMN). The UE utilizes the detected PLMN to determine whether or not the service provider provides service in the UE's location. The controller 18 utilizes a window exclusion logic within the window exclusion logic circuit 6 for overcoming a rejection due to the wrong PLMN. Since detecting the HGC 21, 22 output at peak value always gives the same PLMN, the controller 18 utilizes the window exclusion logic to overcome this deadlock. The window exclusion logic circuit is coupled to the decision logic circuit 2, rejected chip offset vector buffer 9, a rejected chip offset counter 11, a rejected primary scrambling code vector buffer 13, and a rejected primary scrambling code counter 3. The window exclusion logic circuit 6 checks the primary scrambling code output from the step 3 module against the rejected primary scrambling codes stored in the rejected primary scrambling code vector buffer 13. If the primary scrambling code output from the step 3 module is found in the buffer 13, or the wrong PLMN is detected, the window exclusion logic circuit 6 rejects the code and initializes the decision logic circuit again. Each time a primary scrambling code is rejected, the chip offset that was generated by the step 1 module is stored in the rejected chip offset vector buffer 9 and used by the mask generator 5. The mask generator 5 of the decision circuit 25 within the step 1 module 12 uses the values stored in the rejected chip offset vector buffer 9 and rejected chip offset counter 11 from the controller 18 to determine which chips in each slot to exclude in the window. The exclusion of the detected primary scrambling codes and chip offsets are made only within a single frequency band. The buffers and counters are reset when there is an acknowledgment by the base station or new frequency band is used by the level 1 controller.

In order to adjust the frequency band used by the controller 18 during the window exclusion logic process, the layer 1 controller signals the AFC 4 to step to the next frequency in the FAT. Since the offset frequency of the FST is set, the AFC combines the new frequency with the set offset frequency. The VCO or NCO 7 is then adjusted to maintain this combined frequency.

A flow diagram of the window exclusion logic utilized by the controller is illustrated in FIG. 15. The controller 18 runs the cell search decision logic and finds a primary scrambling code (step 1501). The primary scrambling code is passed to the upper layers (step 1502) which store the frequency and the primary scrambling code index (step 1503). If the PLMN is correct for the particular service provider, the UE is synchronized to the base station, and the process is terminated (step 1504). If the PLMN is incorrect and there is a frequency remaining in the FAT of the AGC 4, the AGC 4 steps to the next frequency in the FAT and the controller 18 changes the frequency, stores the primary scrambling code in the vector buffer 13, and resets the cell search algorithm (step 1505). It should be noted that the failure condition monitors either the counter buffers 3, 11, or a timer to determine whether a failed condition occurs. A failed condition indicates that synchronization will not occur under the current conditions (e.g. frequency). If there is no frequency left within the FAT, the controller 18 begins to the sweep the frequencies with the stored primary scrambling code (step 1506). The controller 18 then sets the first frequency and passes the rejected primary scrambling code to the initial cell search with window exclusion method (step 1507). The controller 18 resets the initial cell search with window exclusion method and also resets the failure condition (step 1508). The rejected primary scrambling code is pushed into the rejected primary scrambling code vector buffer 13 and the rejected primary scrambling code counter is incremented (step 1509). The cell search decision logic is run and a primary scrambling code and chip offset are found (step 1510). If the primary scrambling code is stored in the rejected primary scrambling code vector buffer 13, then the chip offset is pushed into the rejected chip offset vector buffer 9 and the rejected chip offset counter 11 is incremented (step 1511). The cell search decision logic is again run excluding a window around the rejected chip offset (step 1512). If the primary scrambling code generated by this cell search decision logic is again stored in the rejected primary scrambling code vector buffer, then the detected chip offset is pushed onto the rejected chip offset vector buffer and the rejected chip offset counter is incremented (step 1511) and the cell search decision logic excluding a window of value rejected chip offset is run again (step 1512). Steps 1511 and 1512 continue until the detected primary code is not in the list at which point the primary scrambling code is forwarded to the upper layers to await an acknowledgment by the base station (step 1513). If there is a failure condition and there is no frequency left, the controller 18 indicates that no service is available (step 1517) and the process is terminated. If there was a failure and there was a frequency remaining in the bandwidth, the controller 18 sets a new frequency and passes the rejected primary scrambling code for that frequency (step 1516). The controller 18 then resets the initial cell search with window excluding method and the failure condition monitor (step 1508). The controller 18 then continues the initial cell search with window exclusion method as disclosed above. If there is no failed condition and the PLMN is correct, the controller 18 indicates that the UE is synchronized to the base station upon receipt of the acknowledgment (step 1518), and the process is terminated. If the PLMN is incorrect, the rejected primary scrambling code is pushed into the rejected primary scrambling code vector buffer 13 and the rejected primary scrambling code counter 3 is incremented (step 1515). The cell search decision logic is run again excluding a window around the previously rejected chip offset value (step 1512). This procedure continues until the controller indicates that no service is available or an acknowledgment from a base station is received.

What is claimed is:

1. A user equipment (UE), comprising:
   a first module configured to process a received communication signal and generate an index value associated with a primary synchronization code within the communication signal, the first module comprising:
   a splitter configured to split a sampled communication signal into even and odd samples;
   a Hierarchical Golay Correlator (HGC) configured to correlate the even and odd samples with a primary synchronization code of the communication signal, and to generate complex values of the even and odd samples;
   an absolute value modifier (AVM) configured to approximate signal strength values for each of the even and odd samples;
   a decision circuit configured to accumulate the approximate signal strength values of the samples within a frame of the communication signal, assigning as an index value a highest accumulated signal strength value, and to determine a chip offset based on the index value;
   a normalizer circuit configured to normalize the accumulated signal strength value;
   a look-up table configured to determine a gain factor;
   a multiplier configured to generate a noise threshold based on the normalized signal strength value and on the gain factor; and
   a comparator configured to compare the noise threshold to the index value in order to make a first decision;
   a second module configured to generate a scrambling code group number, a slot offset, and secondary synchronization code based on output provided by the first module;
   a third module configured to retrieve a primary scrambling code based on the scrambling code group number and slot offset; and
   a controller coupled to the first module, second module, and third module, the controller configured to control a search frequency of the UE for establishing a communication link.

2. The UE of claim 1, wherein the second module comprises:
   a delay module configured to delay the chip offset determined in the first module until the first module makes the first decision;
   a sample selector configured to extract a peak HGC output;
   a conjugator configured to conjugate the extracted peak HGC output;
   an envelope remover configured to remove an envelope sequence from the received communication signal;
   a Fast Hadamard Transformer (FHT) configured to transform a Hadamard matrix of the communication signal;
   a complex multiplier configured to phase correct the transformed Hadamard matrix using the conjugated peak HGC output;
   an input matrix generator configured to generate an input matrix comprising real parts of the Hadamard matrix output by the multiplier;
   a decision circuit configured to generate a correlation matrix comprising the scrambling code group number and the slot offset;
   an RS encoder; and a comparator configured to compare a maximum entry in the correlation matrix to a threshold for outputting a decision.

3. The UE of claim 1, wherein the third module comprises:

a plurality of scrambling code generators, each configured to retrieve the code group number generated by the second module and to generate a scrambling code therefrom;

a plurality of correlator circuits, configured to generate and accumulate correlations of data symbols of the communication signal using output from the scrambling code generators;

a noise estimator;

a decision circuit configured to generate the primary scrambling code based on output from the correlator circuits;

a decision support circuit configured to output the primary scrambling code to the controller;

a multiplier configured to calculate a threshold value by multiplying noise estimates output from the noise estimator by a gain value; and a comparator configured to compare the calculated threshold value to a maximum correlation value and to generate a decision therefrom.

* * * * *

UNITED STATES PATENT AND TRADEMARK OFFICE
CERTIFICATE OF CORRECTION

PATENT NO. : 7,433,437 B2
APPLICATION NO. : 11/205846
DATED : October 7, 2008
INVENTOR(S) : Demir et al.

It is certified that error appears in the above-identified patent and that said Letters Patent is hereby corrected as shown below:

ON THE FACE PAGE

At section (56), OTHER PUBLICATIONS, page 1, right column, line 1, before the words "of Cell" delete "Comparision" and insert therefor --Comparison--.

At section (56), OTHER PUBLICATIONS, page 2, left column, line 5, before the words "Cell Search" delete "Intial" and insert therefor --Initial--.

At section (56), OTHER PUBLICATIONS, page 2, right column, line 54, before the words "vol. 2, pp." insert --New York, NY, US--.

At section (56), OTHER PUBLICATIONS, page 2, right column, line 64, before the words "vol. 82" insert --New York--.

IN THE DRAWINGS

Figure 15A:
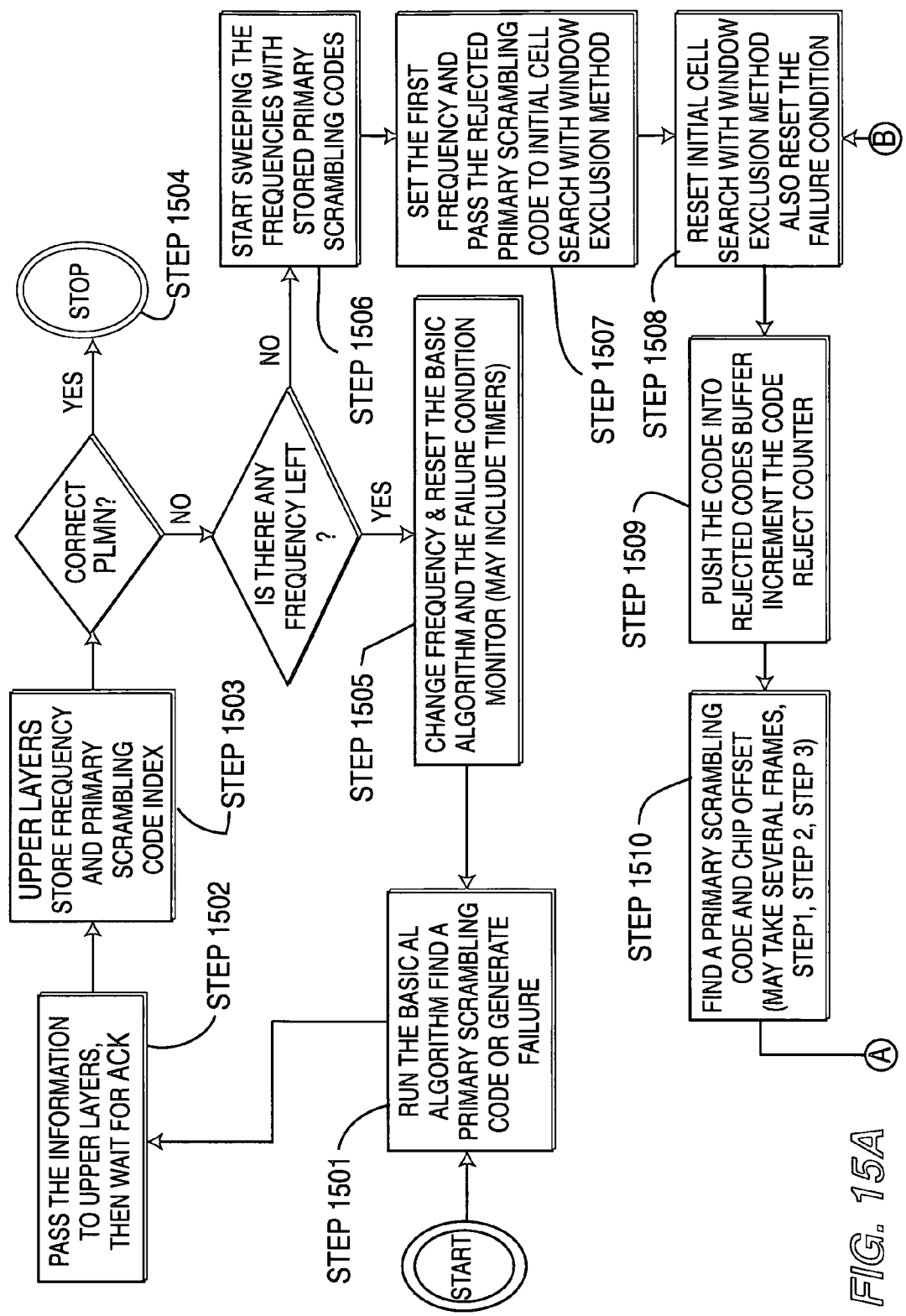

At FIG. 15A, step 1501, line 1, after the word "BASIC" delete "AL".

At FIG. 15B, step 1515, line 2, before the word "REJECTED" delete "NTO" and insert therefor --INTO--.

UNITED STATES PATENT AND TRADEMARK OFFICE
CERTIFICATE OF CORRECTION

PATENT NO.         : 7,433,437 B2
APPLICATION NO.    : 11/205846
DATED              : October 7, 2008
INVENTOR(S)        : Demir et al.

It is certified that error appears in the above-identified patent and that said Letters Patent is hereby corrected as shown below:

IN THE SPECIFICATION

At column 2, line 6, after the word "controlling", delete "an".

At column 4, line 47, after "at 20%", insert --of--.

At column 5, line 13, before the words "the outputs", delete "forwards" and insert therefor --forward--.

At column 5, line 16, before the words "them to", delete "forwards" and insert therefor --forward--.

At column 5, line 59, before the word "search", delete "it" and insert therefor --its--.

At column 6, line 3, before the word "Hadamard", delete "an" and insert therefor --a--.

At column 6, line 10, after the word "envelope", delete "remove" and insert therefor --remover--.

At column 7, line 41, after the word "alarm" delete "(PFA)" and insert therefor --($P_{FA}$)--.

Signed and Sealed this

Ninth Day of December, 2008

JON W. DUDAS
*Director of the United States Patent and Trademark Office*